US007201660B2

(12) United States Patent
Kiely et al.

(10) Patent No.: US 7,201,660 B2
(45) Date of Patent: Apr. 10, 2007

(54) GAMING MACHINE MAINTENANCE SYSTEM AND METHOD

(75) Inventors: Daryn George Kiely, Henderson, NV (US); David Alan Severance, Las Vegas, NV (US); Brian Joseph Casey, Reno, NV (US); Richard I. Ollins, Las Vegas, NV (US); Timothy Wayne Moser, Las Vegas, NV (US)

(73) Assignee: IGT, Reno, NV (US)

( * ) Notice: Subject to any disclaimer, the term of this patent is extended or adjusted under 35 U.S.C. 154(b) by 657 days.

(21) Appl. No.: 10/440,930

(22) Filed: May 19, 2003

(65) Prior Publication Data

US 2004/0235562 A1 Nov. 25, 2004

(51) Int. Cl.

*A63F 13/12* (2006.01)
*A63F 13/02* (2006.01)
*G08B 29/00* (2006.01)
*H04Q 7/20* (2006.01)
*H04N 7/14* (2006.01)
*G06F 13/10* (2006.01)

(52) U.S. Cl. ............................ 463/42; 463/39; 463/40; 463/41; 340/506; 340/539.25; 348/14.02; 714/26

(58) Field of Classification Search .................. 463/39, 463/42; 340/539.25, 506, 679, 7.1; 348/14.02; 455/41.2, 412.2, 423, 67.11, 73; 700/108; 702/181–185; 705/1, 28, 9; 714/26; 715/500
See application file for complete search history.

(56) References Cited

U.S. PATENT DOCUMENTS 5,594,740 A 1/1997 LaDue ........................ 379/59
5,611,730 A * 3/1997 Weiss .......................... 463/20

(Continued)

FOREIGN PATENT DOCUMENTS

DE 19750200 A1 6/1999

(Continued)

OTHER PUBLICATIONS

Compaq iPAQ Pocket PC H3800 Series, Reference Guide, (Mar. 2002).

(Continued)

*Primary Examiner*—Xuan M. Thai
*Assistant Examiner*—Matthew D. Hoel
(74) *Attorney, Agent, or Firm*—Marshall, Gerstein & Borun LLP

(57) ABSTRACT

A handheld maintenance module may be provided with a display unit capable of generating video images, a wireless transceiver device capable of wireless dats transmission and reception and adapted to be wirelessly coupled to a maintenance controller, and a module controller coupled to the display unit and the wireless data transceiver device. the module controller may be programmed to allow a person to receive a gaming unit maintenance work order that represents a request for a repair of a gaming unit, to cause a video image representing the gaming unit maintenance work order to be displayed on the display unit, to cause a video image of one or more instructions to repair the gaming unit to be displayed, to allow the gaming unit maintenance work order to be closed upon completion of the repair of the gaming unit, and to forward repair data to the maintenance controller.

30 Claims, 20 Drawing Sheets

U.S. PATENT DOCUMENTS

| | | | | |
|---|---|---|---|---|
| 5,845,203 | A | 12/1998 | LaDue | 455/414 |
| 5,933,479 | A * | 8/1999 | Michael et al. | 379/110.01 |
| 5,999,808 | A | 12/1999 | LaDue | 455/412 |
| 6,385,621 | B1 | 5/2002 | Frisina | 707/104.1 |
| 6,594,621 | B1 * | 7/2003 | Meeker | 702/185 |
| 2002/0130846 | A1 | 9/2002 | Nixon et al. | |
| 2002/0169514 | A1 * | 11/2002 | Eryurek et al. | 700/110 |
| 2003/0013512 | A1 * | 1/2003 | Rowe | 463/20 |
| 2003/0027631 | A1 | 2/2003 | Hedrick et al. | 463/29 |
| 2003/0054878 | A1 | 3/2003 | Benoy et al. | 463/29 |
| 2003/0064805 | A1 | 4/2003 | Wells | 463/39 |
| 2003/0069648 | A1 * | 4/2003 | Douglas et al. | 700/2 |
| 2003/0078798 | A1 * | 4/2003 | Zaks et al. | 705/1 |
| 2004/0038646 | A1 * | 2/2004 | Bourgart | 455/67.11 |
| 2004/0103165 | A1 * | 5/2004 | Nixon et al. | 709/217 |
| 2004/0176929 | A1 * | 9/2004 | Joubert et al. | 702/184 |
| 2004/0260594 | A1 * | 12/2004 | Maddox | 705/9 |
| 2005/0285934 | A1 * | 12/2005 | Carter | 348/14.06 |

FOREIGN PATENT DOCUMENTS

| | | | |
|---|---|---|---|
| EP | 0 977 162 | A3 | 10/2001 |
| WO | WO 01/41892 | A2 | 6/2001 |

OTHER PUBLICATIONS

International Search Report for Application No. PCT/US2004/015272 dated Sep. 20, 2004.

*Examination Report under Section 18*(3), corresponding to United Kingdom Patent Application Serial No. GB0519242.2, The Patent Office of the United Kingdom, dated Jan. 23, 2006, 2 pages.

* cited by examiner

FIG. 13
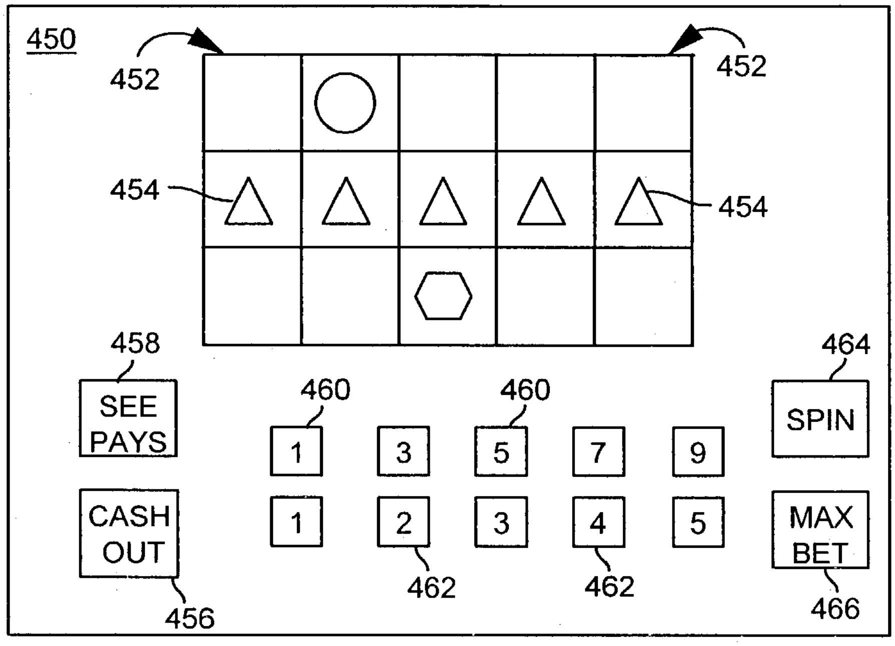
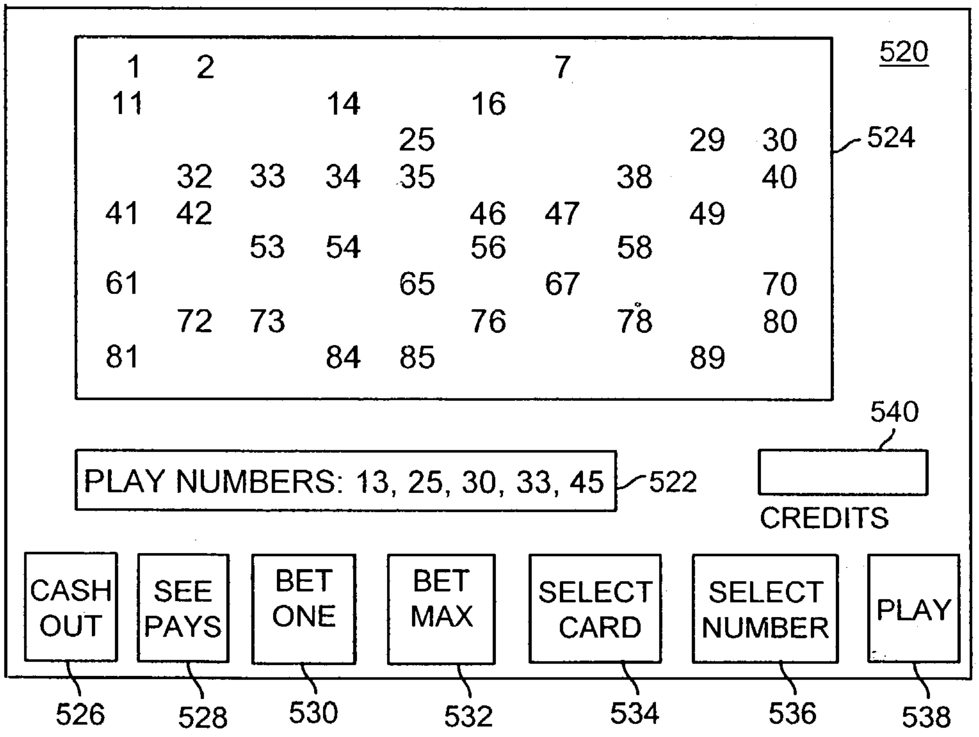
FIG. 14

GAMING MACHINE MAINTENANCE SYSTEM AND METHOD

BACKGROUND

This patent is dorected to a gaming machine maintenance system, which could be either an individual gaming unit or a gaming system having a plurality of gaming units, that is capable of automating gaming machine maintenance fault monitoring and maintenance tracking bia a wireless network.

Casinos expend many man-hours detecting and repairing maintenance faults discovered in the gaming unit network, including the individual casino gaming units. Generally, a work order is generated by a casino staff member when the maintenance fault is discovered in the gaming unit network. The work order is then manually entered into a database and a repair person is selected and dispatched. The repair person diagnoses and resolves the fault. Upon completion of the repair, the work order is closed.

Real-time detection of maintenance faults, or maintenance fault monitoring, of a gaming unit network may be accomplished in a number of ways. For example, traditional manual maintenance fault detection methods may be utilized, requiring the efforts of many casino maintenance personnel. Using these traditional mithods may, however, allow long time intervals to elapse between the onset of a maintenance fault and its discovery by the casino maintenance personnel.

In another example, a partially automated maintenance fault detection method may be utilized. A casino implementing a partially automated maintenance fault detection method may exploit a pre-existing system of the gaming network, for example, a pre-existing security monitoring system, in an attempt to automatically detect faults occurring in the gaming network. Pre-existing systems such as the security monitoring system are typically designed to monitor security faults and are not dedicated to monitor maintenance faults exclusively.

Faults or events occurring in a gaming network may include many types of events from security events such as a faulty door switch on a gaming unit indicating a possible breach of security, to account events such as a gaming unit failing to forward end-of-day meter data to a casino management database, to maintenance events such as a reel tilt, etc.

SUMMARY OF THE INVENTION

In one aspect, the invention is directed to a handheld maintenance module that may comprise a display unit capable of generating video images, a wireless transceiver device capable of wireless data transmission and reception and adapted to be wirelessly coupled to a maintenance controller, and a module controller operatively coupled to the display unit and the wireless transceiver device.

The module controller may be programmed to allow a person to receive a gaming unit maintenance work order that represents a request for a repair of a gaming unit, to cause a video image representing the gaming unit maintenance work order to be displayed on the display unit, to cause a video image of one or more instructins to repair the gaming unit to be displayed, to cause an audio message or indication or a vibration signal to be generated on the handheld maintenance module, to allow the gaming unit maintenance work order to be closed upon completion of the repair of the gaming unit,and to forward repair data to the maintenance controller.

In another aspect, the invention is directed to a maintenance method for a gaming machine that may comprise causing a video image representing a gaming unit maintenance work order to be generated on a display unit of a handheld maintenance module in response to an ocurrence of a gaming unit maintenance event in a gaming unit. The gaming unit maintenance event may represent a problem with the gaming unit, and the video image may represent a request for a repair of a gaming unit to be generated. The method may also include enabling access to a casino expert maintenance system that provides repair instructions to repair the problem with the gaming unit, causing a video image representing the repair instructions to be displayed on the display unit, allowing the gaming unit maintenance work order to be closed upon completion of the repair of the gaming unit, and causing repair data generated during the repair of the gaming unit to be forwarded to a maintenance controller.

Additional aspects of the invention will be apparent to those of ordinary shill in the art in view of the detailed description various embodiments, which is made with reference to the drawings, a brief description of which is provided below.

BRIEF DESCRIPTION OF THE DRAWINGS

FIG. 13 is an illustration of an embodiment of a visual display tha may be displayed during performance of the slots rountine of FIG. 15;

FIG. 14 is an illustration of an embodiment of a visual display that may be displayed during performance of the video keno routine of Fig 16;

DETAILED DESCRIPTION OF VARIOUS EMBODIMENTS

Although the following text sets forth a detailed description of numerous different embodiments of the invention, it should be understood that the legal scope of the invention is defined by thi words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean..."or a similar sentence, there is no intent to limit the meaning of that term, either expressly or by implication, beyond its plain or ordinary meaning, and such tern should not be interpreted to be limited in scope based on any statement made in any section of this patent (other than the language of the claims). To the extent that any term recited in the claims at the end ot this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means⇆ and a function without the recital of any structure, it is not intended that the scope of any claim element be interpreted based on the application of 35 U.S.C. § 112, sixth paragraph.

Figure 1A:
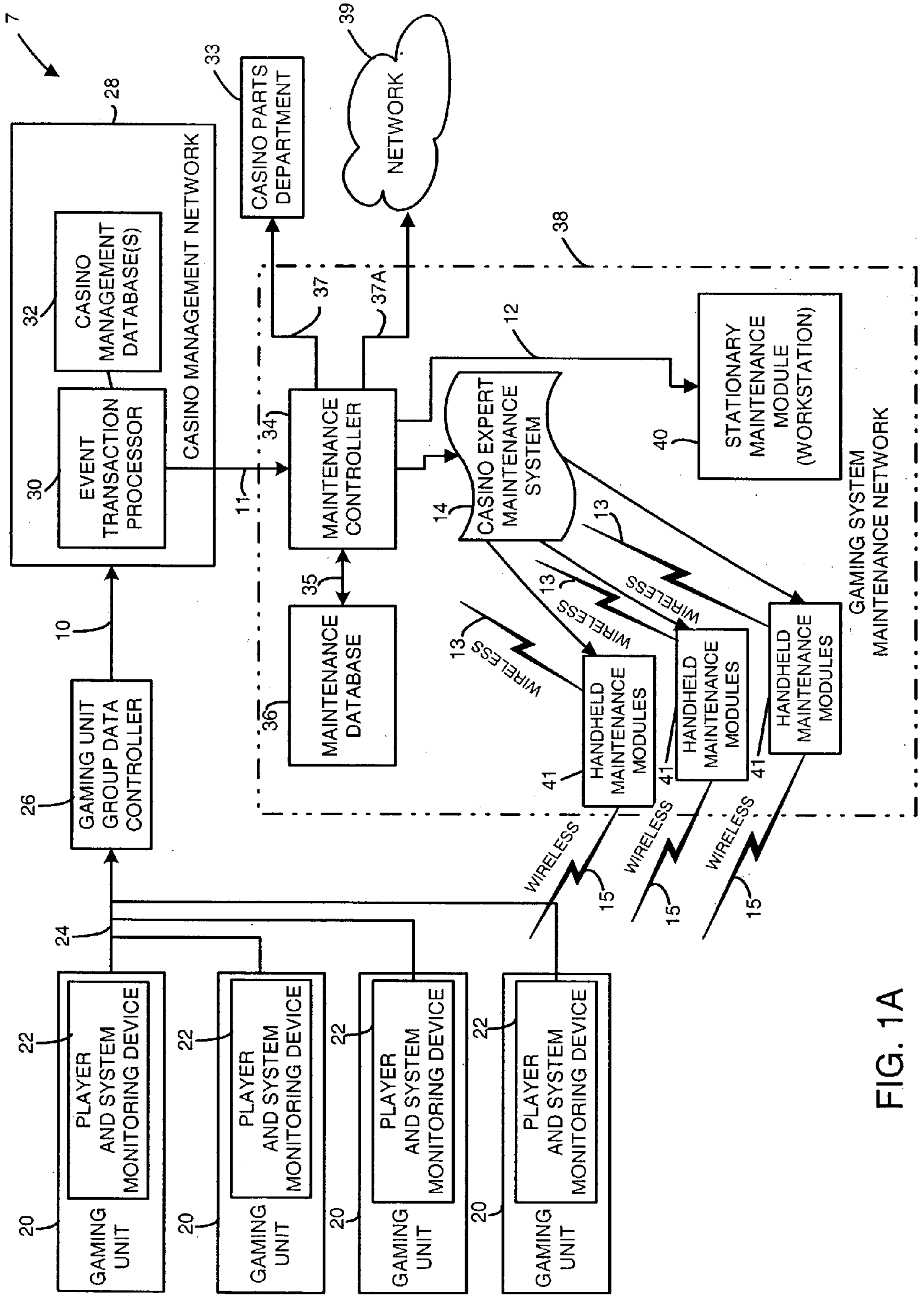
FIG. 1A is a block diagram of an embodiment of a gaming system in accordance with the invention.

FIG. 1A illustrates one possible imbodiment of a gaming system 7 in accordance with the invention. Referring to FIG. 1A, the gaming system 7 may include a group or network of casino gaming units 20, a gaming unit group data controller 26, a casino management network 28, a casino parts department 33, and a gaming system maintenance network 38. Each of the casino gaming units 20 may unclude a player and system monitoring device 22, for example a PT95A, that communicates with the gaming unit 20 via a gaming machine protocol such as slot accounting system (SAS) standard protocol. The network of gaming units 20 may be operatively coupled to the gaming unit group data controller 26 via a data link 24 which may be a serial data link. The casino management network 28 may include an event transaction processor 30 and a casino management database 32 operatively coupled to the gaming unit group data controller 26 via a network data link 10, for example, an internet protocol (IP) link. It should be noted that the network data link 10 may be a wired or a wireless data link.

The gaming system maintenance network 38 may include a maintenance controller 34, a maintenance database 36, a stationary maintenance module or workstation 40 and any number of handheld maintenance modules 41, and may be operatively coupled to the casino management network 28 via a wired or wireless network data link, for example, an IP link 11. The handheld maintenance modules 41 may include, for example, PDAs, Smart Displays (sometimes know as "Mira" devices). The maintenance controller 34 may be operatively coupled to the event transaction processor 30, the maintenance database 36, the casino parts department 33, the network 39, and the maintenance module workstation 40 via data links 11, 35, 37, 37A, and 12, respectively. The data links 11, 35, 37 and 12 may preferably comprise IP data links, although other types of wired or wireless data links may be suitable depending on the type of protocol used to format the data. In addition, the maintenance controller 34 may be operatively coupled to a network 39 which may comprise, for example the Internet, a wide area network (WAN), or a local area network (LAN) via the data link 37A. The network 39 may allow access by the maintenance controller 34 to servers located at one or more casino parts departments 33 or one or more parts departments of the various gaming unit manufacturers.

In the illustrated example, the maintenance controller 34 is operatively coupled to the handheld module workstation 41 via a wireless link 13, for example an IEEE 802.11B wireless protocol link. Although not shown, a wireless hub installed throughout the gaming system 7 may provide the necessary wireless transmission capability to enable wireless transmission to the handheld module workstation 41. In addition, the handheld maintenance modules 41 may be operatively coupled to the gaming unit(s) 20 via an infrared links 15.

Although one gaming unit group data controller 26 and four gaming units 20 are shown, it should be understood that different numbers of controllers and gaming units may be utilized. For example, the gaming system 7 may include a plurality of gaming unit group data controllers 26 and tens or hundreds of gaming units 20, all of which may be interconnected via the data link 24. The data link 24 may be provided as a dedicated hardwired link or a wireless link. Further, although the data link 24 is shown as a single data link 24, the data link 24 may comprise multiple data links.

The player and system monitoring device 22 in each of the gaming units 20 may be configured to perform a number of functions including receiving and reading player tracking cards, and monitoring gaming unit operation or events occurring within the gaming unit 20. The events may be expected events such as an hourly compilation of accounting reports of monies or tokens collected by the gaming machine 20. The events may also be unexpected events that may indicate a problem with operation of the gaming unit 20. An unexpected event can include player tracking events such as a malfunctioning player card reader, security events such as a malfunctioning drop door switch indicating that a faulty switch is present, accounting events such as meter spikes indicating that there is a meter problem with the gaming unit 20, and machine fault events such as a reel tilt indicating that slot reels are not rotating properly. In either case (i.e., expected and unexpected events), during operation of the gaming system 7, data representing the events occurring within the gaming unit 20 may be packetized and forwarded by the player and system monitoring device 22 to the gaming unit group data controller 26 upon receipt of a signal from the gaming unit group data controller 26.

Referring to FIG. 1A, the gaming unit group data controller 26 may be any suitable server computer configured to accumulate and route event data packets to the event transaction processor 30 and to continuously receive event data from each of the player and system monitoring devices 22, for example a Slot Data Controller made by IGT. The event data may indicate the dollar amount and number of wagers being made on each of the gaming units 20, the winning pay-out amount for each of the gaming units 20, the identity and gaming habits of players playing each of the gaming units 20, machine fault occurrences, etc The event transaction processor 30 may be any suitable processor such as an IGS Transaction Processor developed by IGT, configured to perform multiple tasks including receiving, formatting and routing event data packets (i.e., transforming the received data packets into a suitable format, and forwarding the transformed data packets) from the gaming unit data controller 26 to the casino management database 32 and/or the maintenance controller 34. For example, in some cases a casino operator may wish to transform all of the event data packets into an interprocess communication protocol (IPC) by the event transaction processor 30, and then forward the event data packets to the casino management database 32 for processing.

In other cases, the casino operator may wish to transform only the portion of the event data packets determined to relate to maintenance events into an Internet protocol by the event transaction processor 30, and then forward the maintenance event data packets to the maintenance controller 34 for processing. The remaining non-maintenance events could then be transformed and routed to the casino management database 32 for processing. The casino management database 32 may comprise one or more server databases and may be configured to store, organize, sort, provide, etc., data including player tracking events data, security events data, account events data, maintenance events data, etc. As will be appreciated by those of ordinary skill in the art, although not shown, additional monitor controllers 34 may receive data from the event transaction processor 30. For example security monitors may receive security event data, a hot player monitor may receive player event data, etc.

The maintenance controller 34 may be configured to receive maintenance event data and in response, perform a variety of tasks. The tasks may include, among other things, initiating maintenance activity, tracking maintenance activity, and coordinating maintenance activity.

The maintenance controller 34 may also be configured to provide a casino maintenance expert system, deliverable to a slot technician via the handheld maintenance module 41 or the maintenance module workstation 40. The casino maintenance expert system may be constructed to assist the slot technician in resolution of an expected or unexpected event (e.g., a gaming machine tilt condition) and may include, among other things, troubleshooting steps and detailed instructions for addressing/resolving the particular anomalous event. Further, the maintenance controller 34 may be configured to initiate via the data link 37, either automatically or manually by a slot technician, part orders for use in resolving the expected or unexpected event.

The maintenance database 36 may be configured to format, store, and compile data received from a variety of sources including the event transaction processor 30, the handheld maintenance modules 41, and the maintenance module workstation 40. The data stored in the maintenance database 36 may then be organized, sorted, etc., by the maintenance controller 34 for use in the casino maintenance expert system 14. In addition to event data, the data may include the repair history for individual gaming units, repair performance history of individual slot technicians, average times for repairs, etc.

Figure 1B:
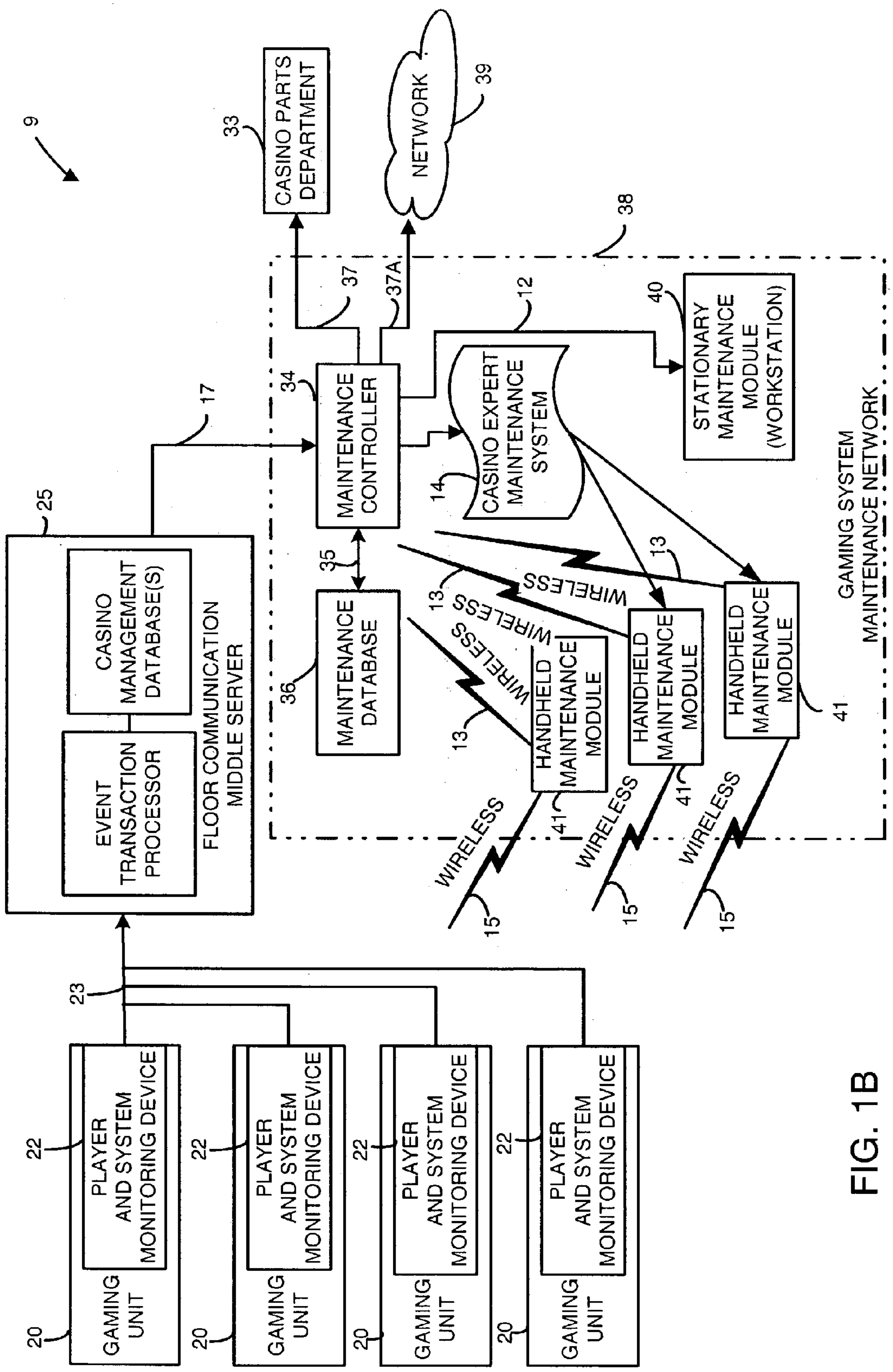
FIG. 1B is a bloch diagram of an alternative embodiment of a gaming system in acordance with the invention.

FIG. 1B illustrates another possible embodiment of a gaming system 9 in accordance with the invention. Referring to FIG. 1B, the gaming system 9 may be identical or substantially identical to the system 7 described above, except that a floor communication middle server 25 may be provided instead of a gaming unit data controller 26 and a casino management network 28 which are shown in FIG. 1A.

Referring to FIG. 1B, the network of gaming units 20 may be operatively coupled to the floor communication middle server 25 via a wired or wireless data link 23 which may be a TCP/IP link, and a wired or wireless data link 17 may couple the middle server 25 to the maintenance controller 34. Although depicted as one element, the floor communication middle server 25 may combine the functionality provided by the gaming unit group data controller 26, the event transaction processor 27, and the casino management database 32 shown in FIG. 1A.

During operation of the gaming system 9, data representing expected and/or unexpected events (as noted above) occurring within the gaming unit 20 may be forwarded by the player and system monitoring device 22 to the floor communication server 25. However, a poll signal may not be required by the player and system monitoring device 22 in order to forward the data.

The floor communication middle server 25 may be a server computer and may be used to accumulate and route event data packets from the player and system monitoring device 22 to the maintenance controller 34 of the gaming system maintenance network 38. In addition, the floor communication middle server 25 may be configured perform additional tasks including receiving event data packets from the player and system monitoring device 22, transforming the received event data packets into a suitable format if necessary, and forwarding the a portion of the event data packets, determined to relate to maintenance events, to the maintenance controller 34.

Figure 2:
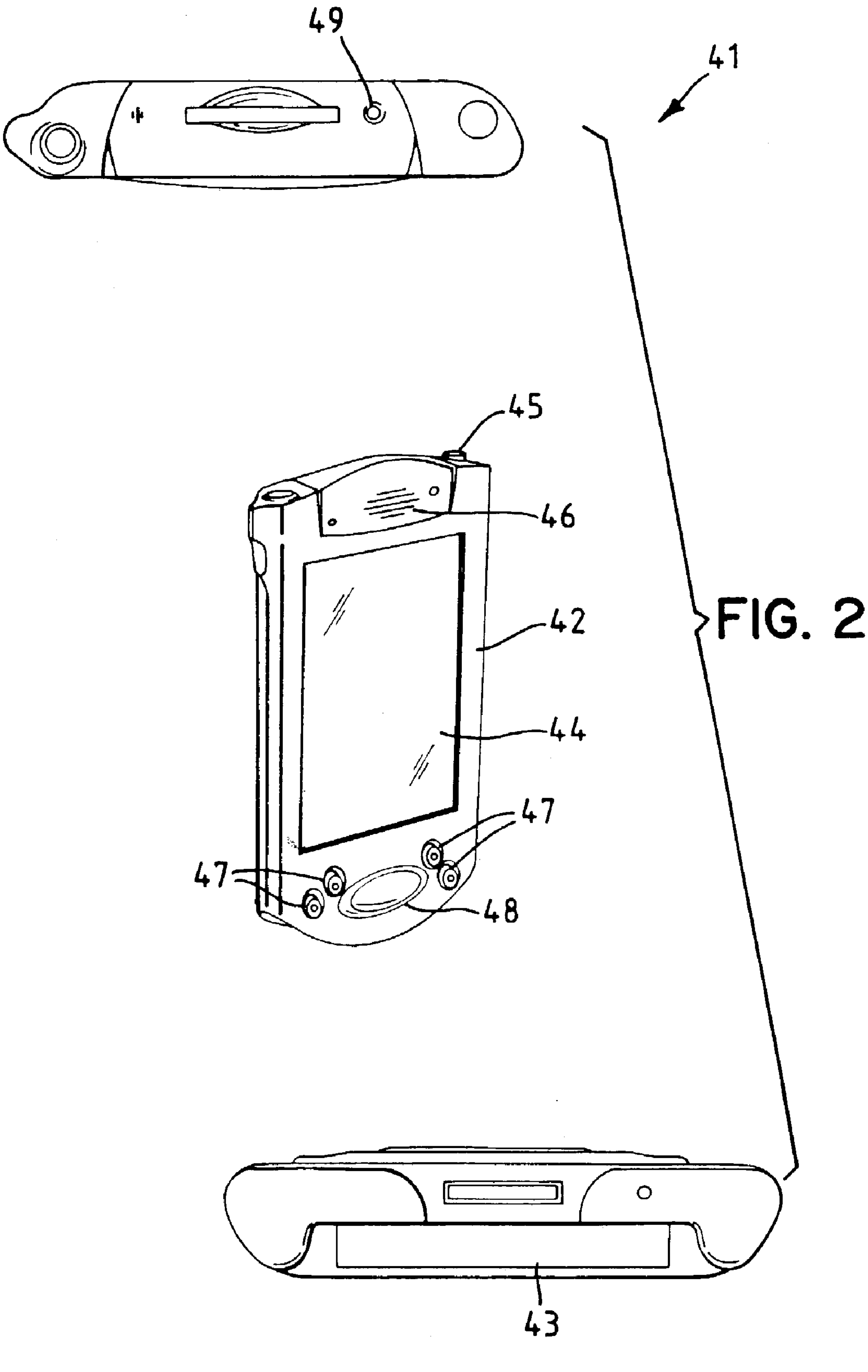
FIG. 2 illustrates a number of views of an embodiment of the handheld maintenance module shown schematically in FIGS. 1A and 1B.

FIG. 2 illustrates several views of one possible embodiment of the handheld maintenance modules 41 shown schematically in FIGS. 1A and 1B, which may be adapted to provide portable interfaces to the gaming unit 20 via wireless transceivers that may include infrared transceivers, and to the maintenance controller 34 via a wireless transceiver. As used herein, the term ‘wireless transceiver’ is hereby defined to mean any device that sends and/or receives information by use of Radio Frequency (RF), Infrared (IR), magnetic field, or electric field. For example, an iPAQ Pocket PC H3800 Series, manufactured by Compaq, may be adapted to provide such a portable interface. Although the following description addresses the design of the handheld maintenance modules 41, it should be understood that numerous other designs may be utilized.

Refening to FIG. 2, the handheld maintenance module 41 may include a housing 42 designed to allow a person such as a slot technician, to easily transport the handheld maintenance module 41 to the various gaming units 20 in need of maintenance. The housing 42 may include an expansion connector port 43 configured to receive one or more PCM- CIA cards depending on the functionality desired. For example, utilization of an iPAQ Card Expansion Pack & WL110 Wireless LAN PC Card in the expansion connector port 43 may provide, among other things, a wireless transceiver capability, for example, IEEE 802.11B capability, to the handheld maintenance module 41. Similarly, a capability to scan a bar code, for example a gaming unit identifier bar code, may be included via a PCM/CIA card. These functions may alternatively be built into the handheld maintenance module 41 and not require expansion slots or cards.

Optical communication between the gaming unit(s) 20 and the handheld maintenance modules 41 may occur via an optical link provided by an infrared transceiver 49. Information optically transmitted from the gaming unit 20 may include meter readings and fault codes identifying specific types of faults, and information optically transmitted from handheld maintenance module 41 may include queries to the gaming unit 20 for specific information (e.g. meter data).

The handheld maintenance module 41 may also include a monochrome or color display monitor 44 configured to display video images representing text and all manner of possible maintenance related images including video images relating to initiating maintenance activity, tracking maintenance activity, coordinating maintenance activity, providing a casino maintenance expert system, including troubleshooting steps and detailed instructions, and initiating part orders. A video image of one or more note pads may be provided to allow the slot technician using a stylus 45 to enter notes relating to maintenance activities into the handheld maintenance module 41. The display monitor 44 may also be configured with a touch screen to allow selection of various video images that may include an alphanumeric keyboard. A navigation button 48 and a number of programmable application buttons 47 may be provided to allow easy access to information and video images displayed on the display monitor 44. In addition, a communication device, such as, for example, a speaker 46, or any other suitable device allowing alarms, recordings, audio messages, and communication, and a microphone (not shown) enabling two way communication via voice, that may be implemented by voice-over-IP between the slot technician and another person or machine, may be included in the handheld maintenance module 41.

Handheld Maintenance Module Electronics

Figure 3:
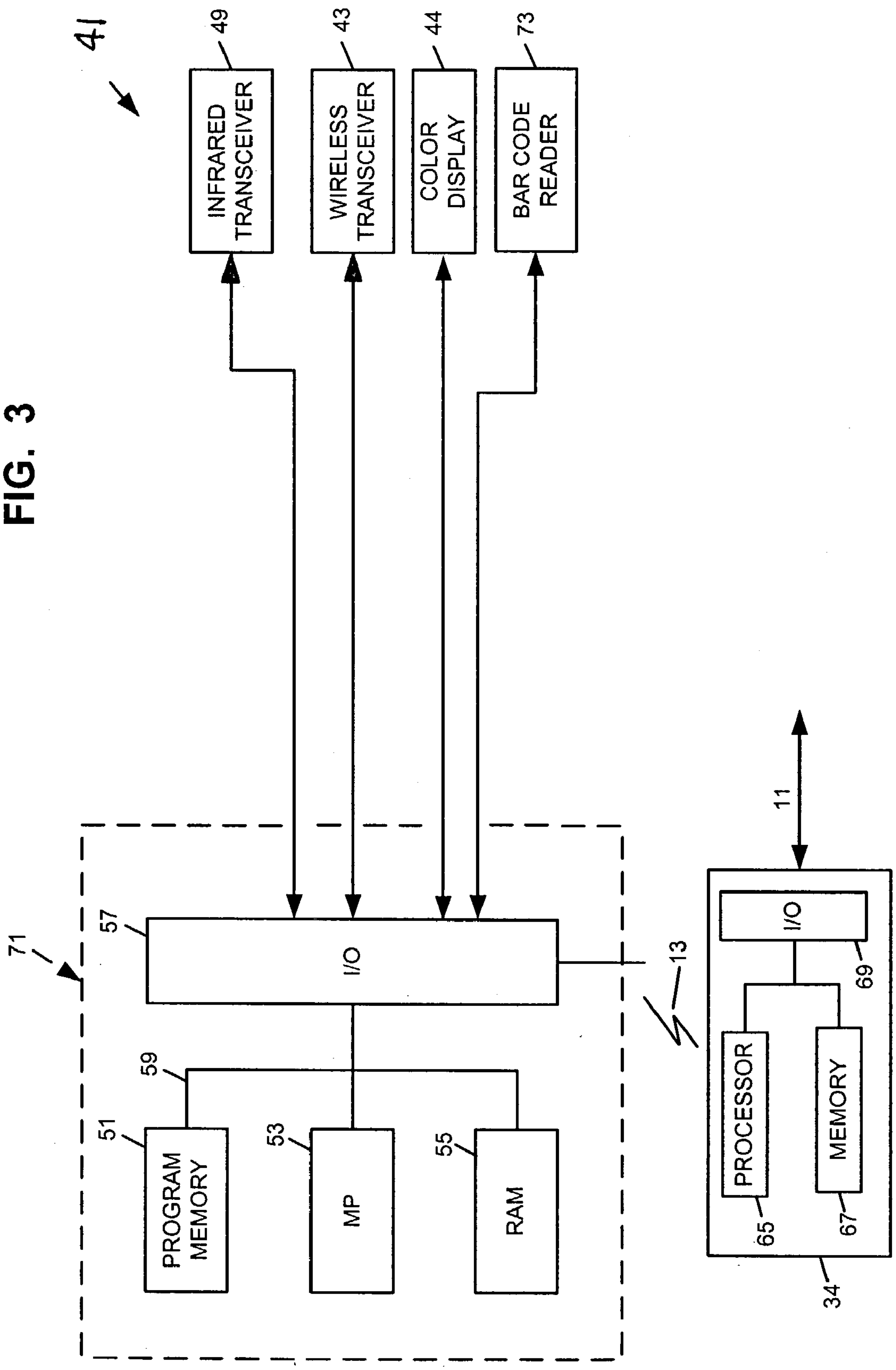
FIG. 3 is a block diagram of the electronic components of the handheld maintenance moduld of FIG.2.

FIG. 3 is a block diagram of a number of components that may be incorporated in the handheld maintenance module 41. Referring to FIG. 3, the handheld maintenance module may include a controller 71 that may comprise a program memory 51, a micro-controller or microprocessor (MP) 53, a random-access memory (RAM) 55 and an input/output (I/O) circuit 57, all of which are interconnected via an address bus 59. It should be appreciated that although only one microprocessor 53 is shown, the controller 71 may include multiple microprocessors 53. Similarly, the memory of the controller 71 may include multiple RAM(s) 55 and multiple program memories 51. Although the I/O circuit 57 is shown as a single block, it should be appreciated that the I/O circuit 57 may include a number of different types of I/O circuits. The RAM(s) 55 and the program memories 51 may be implemented as semiconductor memories, magnetically readable memories, and/or optically readable memories, for example.

FIG. 3 illustrates that the infrared transceiver 49, the wireless transceiver 43, the display monitor 44, and a bar code reader 73 (that may or may not be included in the same PCMCIA card providing the wireless transceiver 43), may be operatively coupled to the I/O circuit 57, each of those components being so coupled by either a unidirectional or bidirectional, single-line or multiple-line link, which may depend on the design of the component used.

The components 43, 44, 49, and 73 may be connected to the I/O circuit 57 via a direct line or may be built into the circuit 57. Different connection schemes could be used. For example, one or more components shown in FIG. 3 may be connected to the I/O circuit 57 via a common bus or other data link that is shared by a number of components. Furthermore, some of the components may be directly connected to the microprocessor 53 without passing through the I/O circuit 57.

As is shown in FIG. 3, the controller 71 of the handheld maintenance module 41, may be operatively coupled to the maintenance controller 34 via the wireless link 13, thereby permitting a free flow of data between the controller 71 and the maintenance controller 34. Like the controller 71, the maintenance controller 34 may include a processor 65 and a memory 67 interconnected to an I/O.

Figure 4:
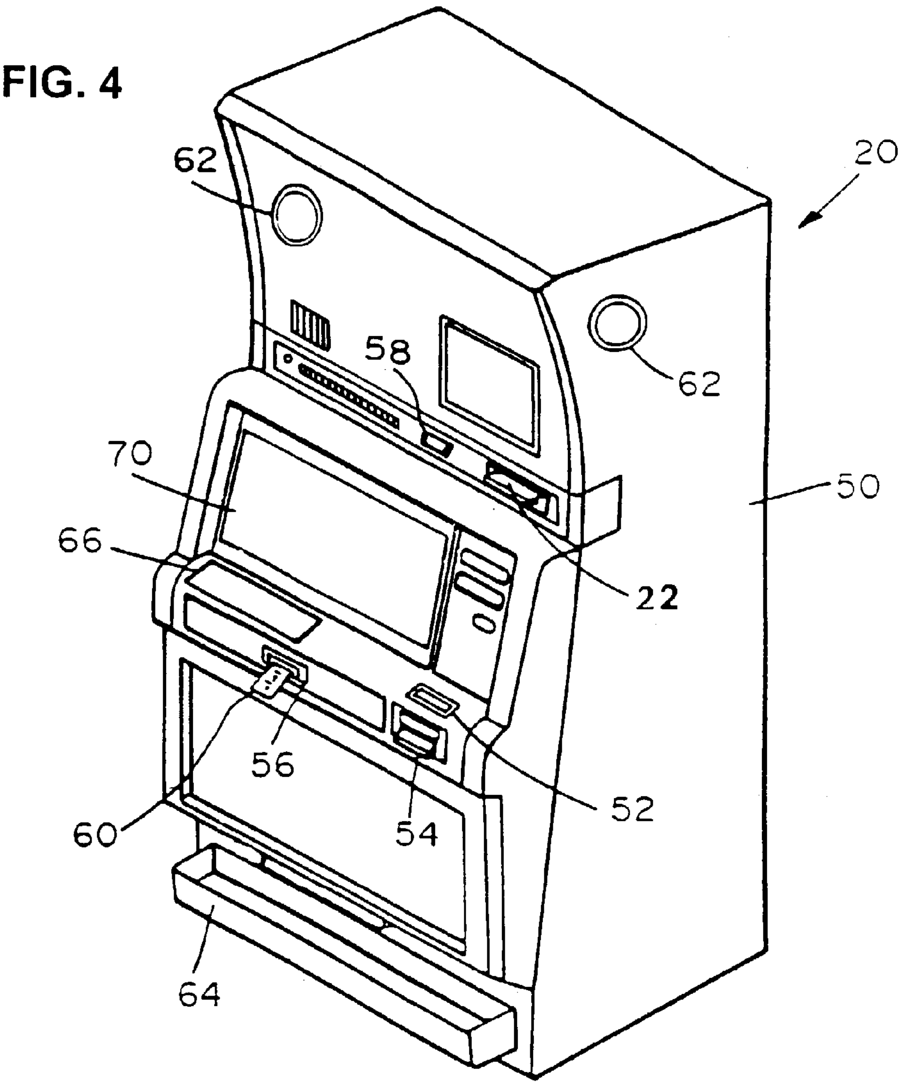
FIG. 4 is a perspective view of an embodiment of one of the gaming units shown schematically in FIGS. 1A and 1B.

FIG. 4 is a perspective view of one possible embodiment of one or more of the gaming units 20. It should be understood that the design of one or more of the gaming units 20 may be different than the design of other gaming units 20. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 4, the casino gaming unit 20 may include a housing or cabinet 50 and one or more input devices, which may include a coin slot or acceptor 52, a paper currency acceptor 54, a ticket reader/printer 56 and a card reader 22, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 22 may include any type of card reading device, such as a magnetic card reader or an optical card reader, and may be used to, among other things, read data from a card offered by a player, such as a credit card or a player tracking card. If provided for player tracking purposes, the card reader 22 may be used to read data from, and/or write data to, player tracking cards that are capable of storing data representing the identity of a player, the identity of a casino, the player's gaming habits, etc. In addition, the card reader 22 may be configured to operate as an interface between the gaming unit(s) 20 and either the gaming unit group data controller 26 or the floor communication middle server 25, as described above in connection with FIGS. 1A and 1B.

The gaming unit 20 may also include one or more built-in optical transceiver(s) 58, that may be configured as to optically transmit data to, and receive data from, other infra-red-equipped devices such as the handheld maintenance module 41, among other things. The optical transceiver may be configured in any number of configurations to enable unidirectional and/or bidirectional optical transmission of data The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 4A:
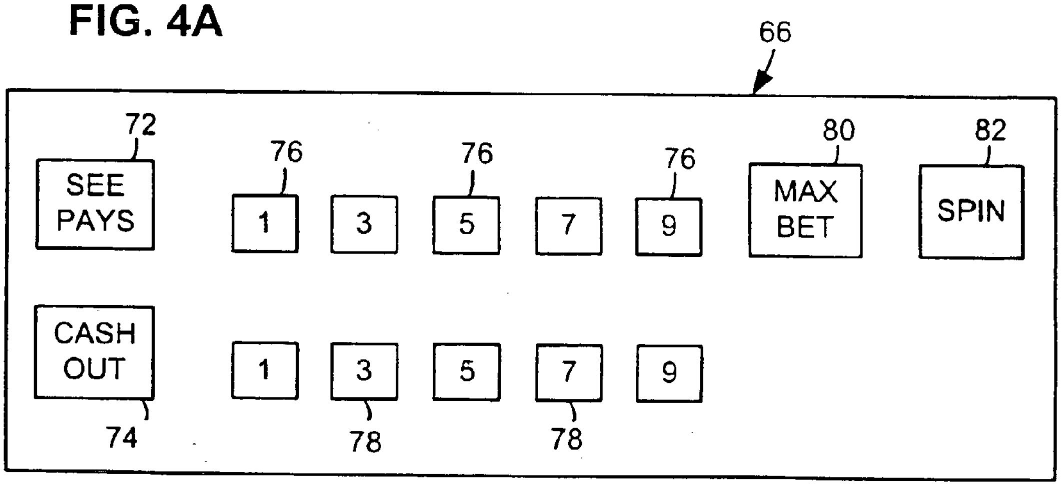
FIG. 4A illustrates an embodiment of a components of the gaming unit.

FIG. 4A illustrates one possible embodiment of the control panel 66, which may be used where the gaming unit 20 is a slot machine having a plurality of mechanical or "virtual" reels. Referring to FIG. 4A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 4A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 5:
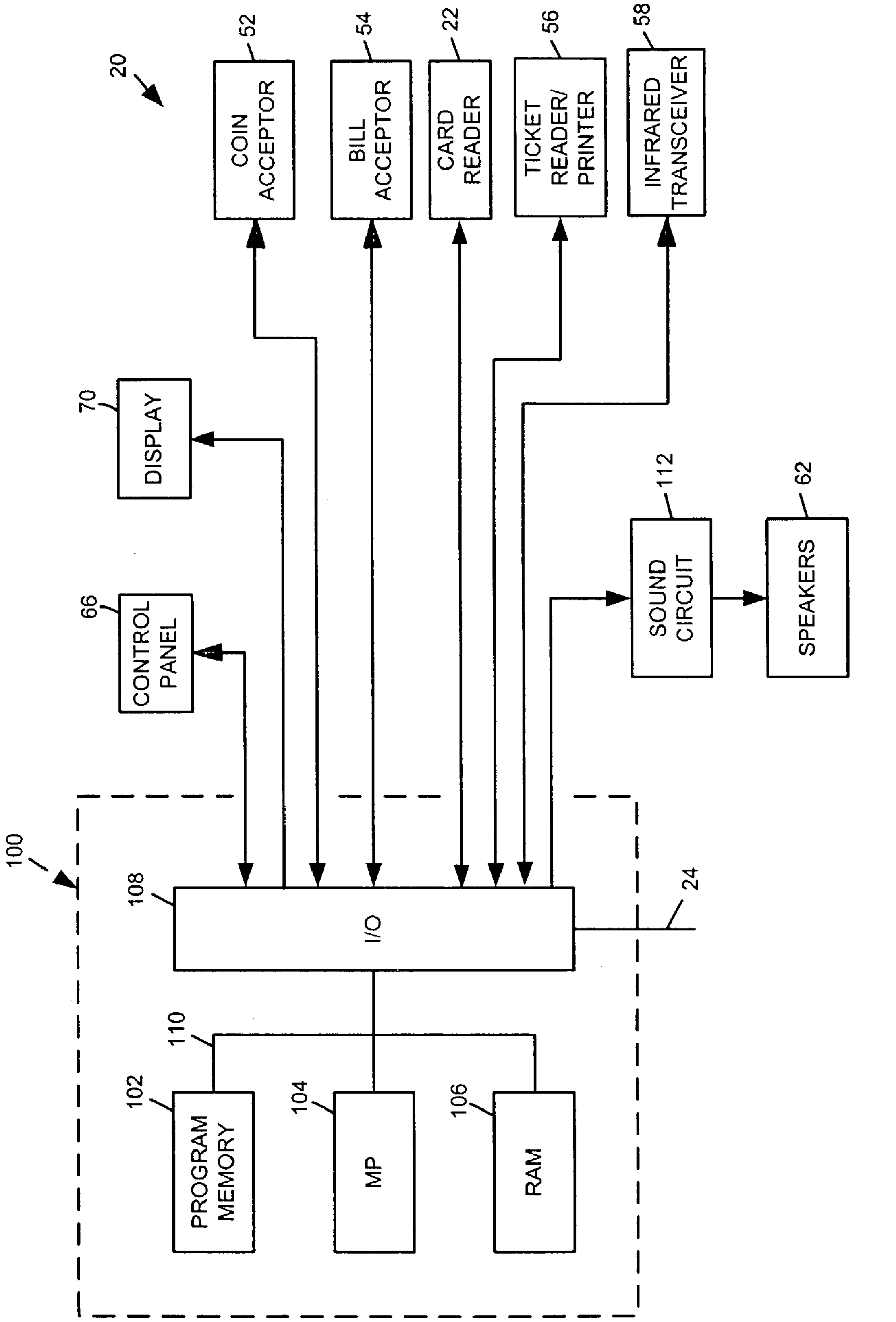
FIG. 5 is a block diagram of the electronic components of the gaming unit of FIG. 4.

FIG. 5 is a block diagram of a number of components that may be incorporated in the gaming unit 20. Referring to FIG. 5, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 5 as a read-only memory (ROM) 102, the program memory of the controller 100 may be a read/write or alterable memory, such as a hard disk. In the event a hard disk is used as a program memory, the address/data bus 110 shown schematically in FIG. 5 may comprise multiple address/data buses, which may be of different types, and there may be an I/O circuit disposed between the address/data buses.

FIG. 5 illustrates that the control panel 66, the display 70, the coin acceptor 52, the bill acceptor 54, the card reader 22, the ticket reader/printer 56, and the optical transceiver 58 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 5, the components 22, 52, 54, 56, 58, 66, 70, 112 may be connected to the I/O circuit 108 via a respective direct line or conductor. Different connection schemes could be used. For example, one or more of the components shown in FIG. 5 may be connected to the I/O circuit 108 via a common bus or other data link that is shared by a number of components. Furthermore, some of the components may be directly connected to the microprocessor 104 without passing through the I/O circuit 108.

Overall Operation of Gaming System Maintenance Network

One manner in which the gaming system maintenance network 38 may operate is described below in connection with a number of flowcharts which represent a number of portions or routines of one or more computer programs, which may be stored in one or more of the memories of the handheld maintenance module controller 71 of the handheld maintenance module 41, and the maintenance controller 34. The computer program(s) or portions thereof may be stored remotely to control the operation of the handheld maintenance module 41 and the maintenance module workstation 40. Such remote control may be facilitated via a wireless connection, or by an Internet interface that connects the gaming system maintenance network 38 with a remote computer having a memory in which the computer programs are stored. The computer portions may be written in any high level language such as C, C++, C#, Java or the like or any low-level assembly or machine language. By storing the computer portions therein, various portions of the memories 51, 53, 67 are physically and/or structurally configured in accordance with computer program instructions.

Figure 6A:
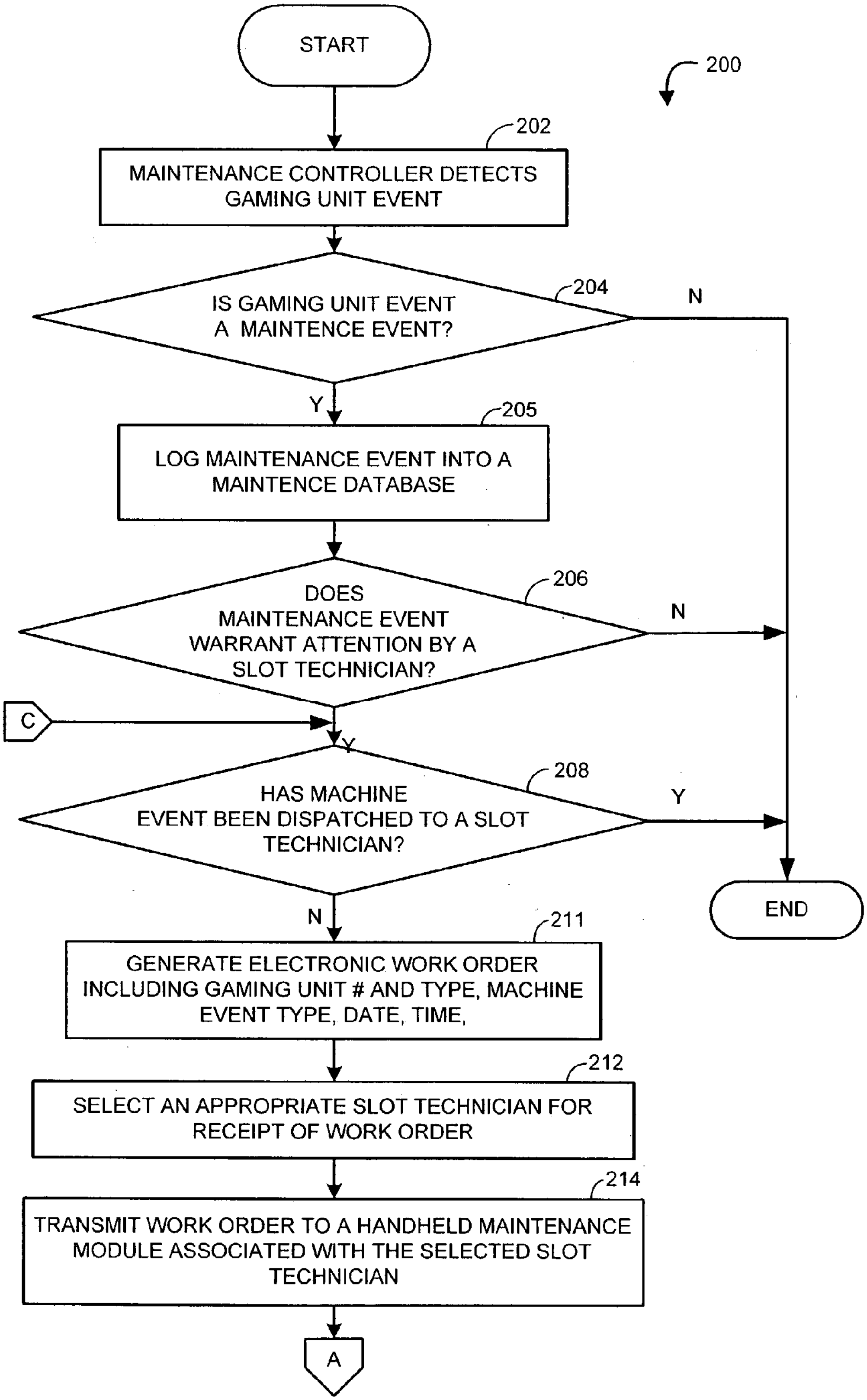
FIGS. 6A–6C are a flowchart of an embodiment of main that may be performed during operation of a gaming system maintenance network of the gaming system in accordance with the invention.
Figure 6B:
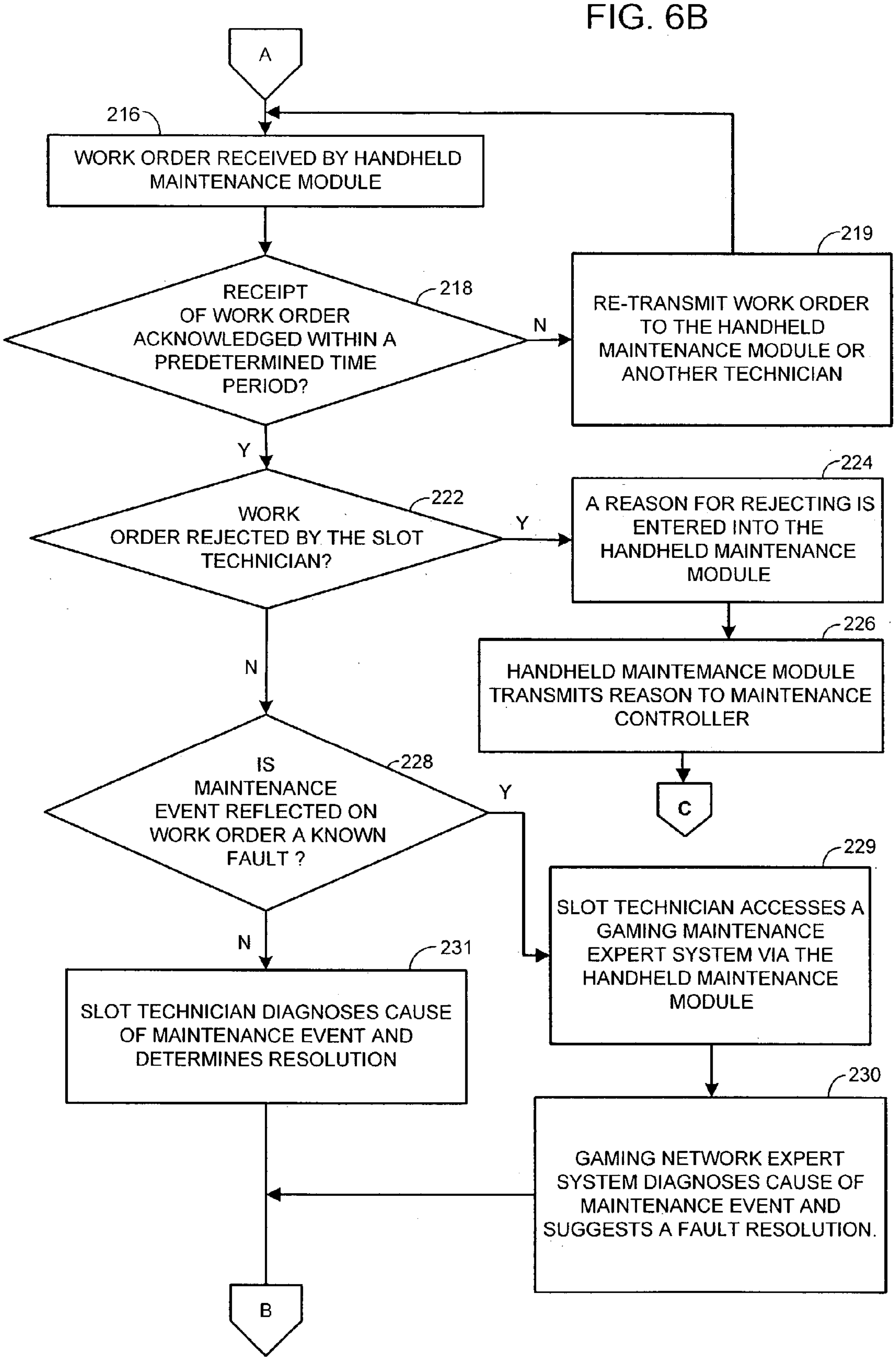
Figure 6C:
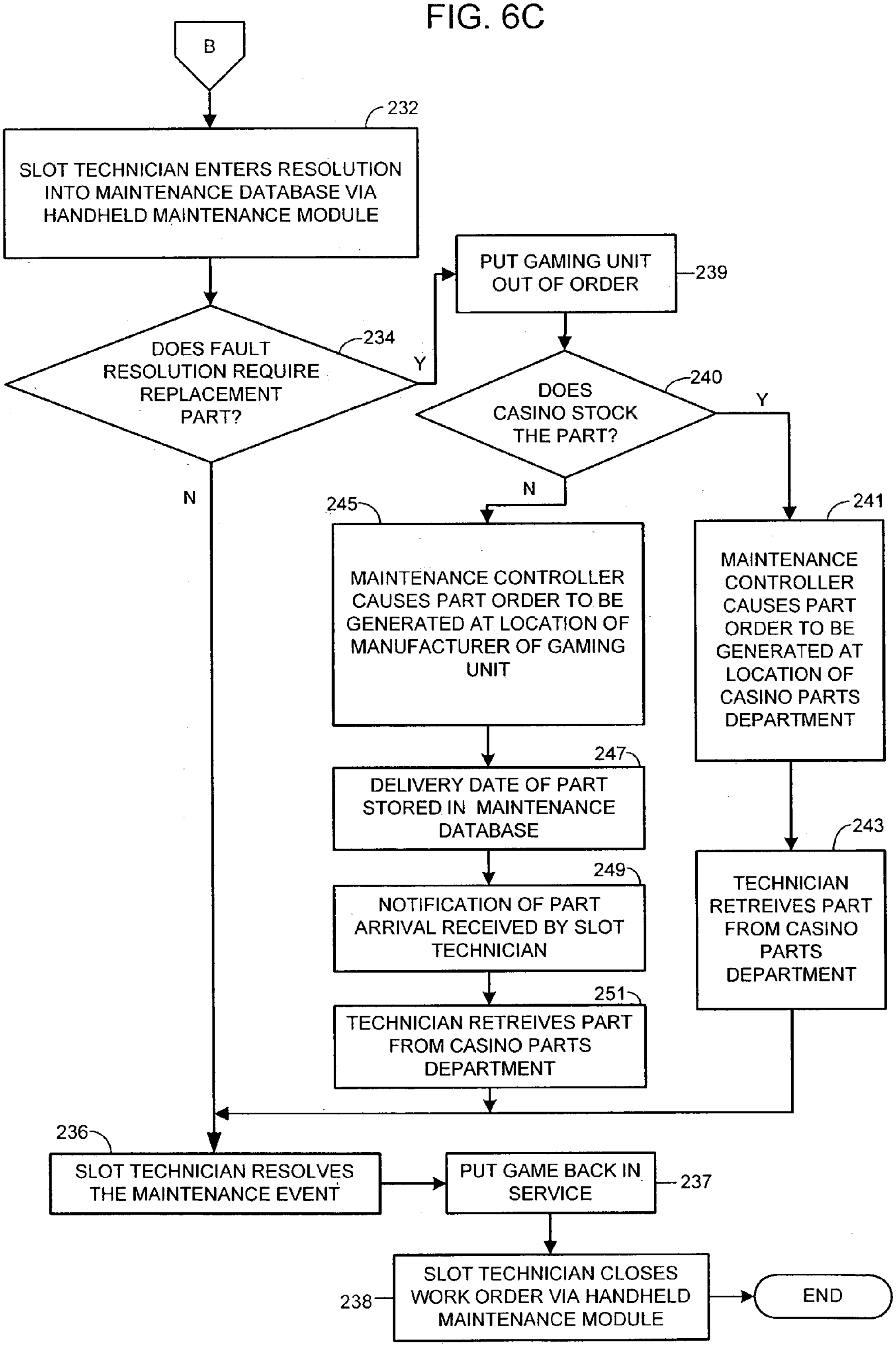

FIGS. 6A–6C are a flowchart of a main operating routine 200 that may be stored in the memory of controllers 71 and 34. Referring to FIG. 6A, the main routine 200 may begin operation at block 202 where the maintenance controller 34 detects a gaming unit event, which may be a maintenance event or a non-maintenance event. Maintenance events may include reel tilts, CRC errors, a jam in the bill acceptor, coin acceptor, card reader, etc while non-maintenance events may include hourly compilation of tokens received by the individual gaming machine(s) 20, and the like. At a decision block 204, it may be determined whether the gaming unit event is a maintenance event, either by the event transaction processor 30 of FIG. 1A, or by the floor communication middle server 25 of FIG. 1B. Both the event transaction processor 30 (FIG. 1A) and the floor communication middle server 25 (FIG. 1B) may be adapted to forward only the maintenance events to the maintenance controller 34 from among all types of gaming units events (e.g., the player tracking events, the security events, the account events, the machine fault events, etc).

If it is determined at the decision block 204 that the gaming unit event is not a maintenance event, gaming system maintenance is not invoked. If it is determined at the block 204 that the gaming unit event is a maintenance event, the maintenance event may be logged into the maintenance database 36 at a block 205. The routine 200 may then determine (block 206) if the maintenance event is one which requires attention by a slot technician. If the maintenance event does not require attention, gaming system maintenance may not be invoked and the routine 200 may end. If it is determined at the block 206 that the maintenance event is one that requires attention by a person, herein referred to as a "slot technician," the routine 200 may determine if the machine event has been dispatched to a slot technician (block 208). If it is determined at the block 208 that the machine event has already been dispatched to a slot technician, the routine 200 may end. If, however, the maintenance event is one that still requires attention by a slot technician, a work order may be automatically generated (block 211).

Although not shown, it is contemplated that some types of gaming unit maintenance events may cause a dispatched message to be generated by the gaming unit 20 or by the event transaction processor 30 (FIG. 1A) or the floor communication middle server 25 (FIG. 1B), and sent via a telephone, the internet, an extranet to a service center of a maintenance support organization. Similarly, it is contemplated that dispatch messages may be generated for periodic routine maintenance and forwarded to the maintenance support organization.

The work order may include a gaming unit identification number, a gaming unit type (e.g. model number), a machine event type, and a date and time, among other things. Next, based on a number of factors including the location of the occurrence of the maintenance event, the type of maintenance event, locations of available slot technicians currently located on the casino floor, etc., an appropriate slot technician for resolution/repair may be selected at a block 212. The maintenance event work order may then be transmitted via the wireless link 13 to a handheld maintenance module 41 associated with the selected slot technician (block 214). Alternatively, the work order may also be transmitted to the maintenance module workstation 40 for receipt by a slot technician.

Referring to FIG. 6B, the work order may be received by the slot technician via the maintenance module 41, at block 216. The work order may be a video image that includes text, or it may be only an audio message, or it may be a combination of both. If an audio message is included, the message may be generated directly from a file associated with the work order that eliminates the need for any human intervention/translation. In other words, speech recognition and audio generation techniques known to those of ordinary skill in the art may be used in the processes of generating and receiving audio messages.

Next, it may be determined whether receipt of the work order may be acknowledged by the slot technician within a predetermined time period at a decision block 218. The predetermined time period may be selected based on a number of factors including the gaming machine type, the time and date, whether the casino is experiencing heavy traffic, etc.

If receipt of the work order is not acknowledged by the slot technician within a predetermined time period, as determined at the block 218, the work order may be retransmitted to the same slot technician or another slot technician via the handheld maintenance module 41 or the maintenance module workstation 40 (block 219). The routine 200 may then return to the block 216. If receipt of the work order is acknowledged by the slot technician within a predetermined time period, it may be determined whether slot technician rejected or accepted the work order at decision block 222.

The slot technician may reject the work order for a number of reasons, for example if the slot technician is not available on the casino floor, if the slot technician is working on another problem, etc. If the work order is rejected, at block 224 the slot technician may be required to note, via a client input device, either fixed or portable, on the handheld maintenance module 41, the reason for rejecting the work order. The client input device may include the touch screen keyboard, the notepad, etc. Once entered, the reason for rejecting the work order may be forwarded (via the wireless link 13), at block 226, to the maintenance database 36 for statistical compilation including addition to the casino expert maintenance system 14. Another slot technician may then be assigned to resolve the problem. Thereafter, the routine 200 may again determine if the maintenance event warrants attention by a slot technician (block 206).

Still referring to FIG. 6B, if the work order is accepted by the slot technician, it may be determined whether the maintenance event reflected on the work order is a commonly known maintenance event at decision block 228. If it is determined that the maintenance event is a known maintenance event, the slot technician may access the casino expert maintenance system 14 via the handheld maintenance module 41, at block 229. Alternatively, the slot technician may access the casino expert maintenance system 14 via the maintenance module workstation 40 or another gaming machine 20.

At a block 230, the casino expert system 14 may diagnose the cause of the maintenance event and suggest a fault resolution. If the maintenance event reflected on the work order is not a commonly known maintenance event, at block 231, the slot technician, using his/her expertise and tools available via the handheld maintenance module 41, may diagnose the cause of the maintenance event and determine a resolution to the maintenance event.

Referring to FIG. 6C, at block 232, the slot technician may enter the resolution to the maintenance event into the maintenance database 36 via either the handheld maintenance module 41 or the maintenance module workstation 40. Using the handheld maintenance module 41, it may be determined whether resolution to the maintenance event requires replacement of a gaming unit part at decision block 234. If it is determined that resolution of the maintenance event does not require replacement of a gaming unit part, the slot technician may resolve the maintenance event (block 236), put the gaming unit back in service (block 237), and close the work order (block 238).

In addition, statistics/data associated with resolving the maintenance event, and statistics/data associated with closing the work order, for example, the time elapsed between diagnosing and resolving the work order, the time elapsed between notification to the slot technician and resolving the work order, etc., may be forwarded via the handheld maintenance monitor 41 to the maintenance controller 34 to update the expert maintenance system.

If it is determined at the block 234 that resolution to the maintenance event requires replacement of a gaming unit part, the gaming unit may be put out of order (block 239). It may then be determined whether the casino in which the maintenance event occurred possesses the gaming unit part in its casino parts department (block 240). If the casino possesses the gaming unit part, the maintenance controller 34 may automatically cause a part order to be generated at the location of the casino parts department (block 241). The part order may be generated via a printer located at or near the casino parts department, and operatively coupled to the maintenance controller 34. Alternatively, the part order may be generated on a user interface located at or near the casino parts department, and operatively coupled to the maintenance controller 34. Once ready, the part may be retrieved from the parts department by the slot technician (block 243).

Returning to decision block 239, if it is determined that the casino in which the maintenance event occurred does not possess the gaming unit part in its casino parts department, the maintenance controller 34 may, via the network 39, cause a computer server located at the parts department of the gaming unit manufacturer to automatically generate a part order for the part, at block 245. Upon receipt of the part order, various notifications may be sent to the maintenance controller 34 via a number of routes. For example, a notification of part availability may be electronically forwarded from the computer server located at the parts department of the gaming unit manufacturer to the event transaction processor 30. The notification of part availability may then be forwarded to the gaming system maintenance network for use by the maintenance controller 34. Similarly, notification of delivery of the part may be electronically forwarded from the computer server located at the parts department of the gaming unit manufacturer to the event transaction processor 30 and then to the gaming system maintenance network 38. At block 247, all notifications, dates and pertinent information regarding the part may be stored in the maintenance database 36.

Upon receipt of the part, if applicable, at block 249 a notification of part arrival may be sent to either the original slot technician via the handheld maintenance module 41, or may be sent to another slot technician via either the handheld maintenance module 41 or the maintenance module workstation 40. The slot technician may retrieve the part at block 251 from the appropriate location, for example, the casino parts department 33. Using the part, the slot technician may then resolve the maintenance event at block 236, and close the work order at block 238.

Figure 6D:
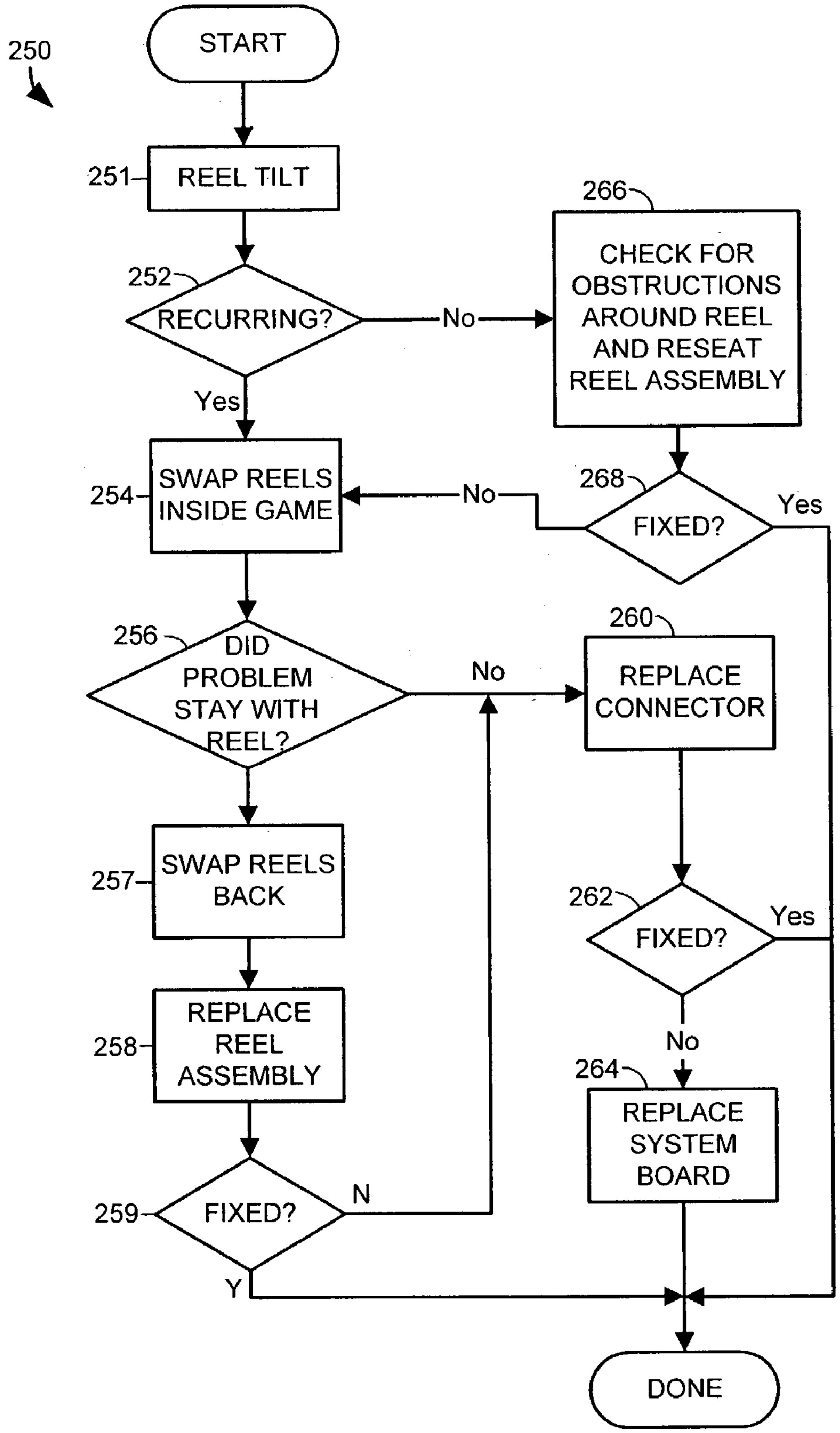
FIG. 6D is a flowchart of an embodiment of an example diagnostic routine that may be performed during operation of a gaming system maintenance network of the gaming system in accordance with the invention.

Referring again to the decision block 228, if it is determined that the maintenance event is a known maintenance event, the maintenance controller 34 may cause one of a number of maintenance resolution routines to be performed to allow the maintenance event to be resolved via the expert maintenance system, such as the one shown in FIG. 6D.

FIG. 6D is a flowchart of an embodiment of an exemplary diagnostic routine 250 that may be provided by the casino expert maintenance system 14 to a slot technician via the handheld maintenance module 41 or the (stationary) maintenance module workstation 40. Referring to FIG. 6D, the diagnostic routine 250 may begin operation at block 251 where a reel tilt is detected. The routine 250 may determine whether the maintenance event (e.g., a reel tilt condition) is a recurring maintenance event (block 252). If the reel tilt causing the maintenance event is determined to be recurring, the slot technician may be directed to swap or change the positions of the existing mechanical reels at a block 254 where the gaming unit 20 is a slot machine. If the reel tilt causing the maintenance event persists despite changing the mechanical reel positions at a block 256, the slot technician may be directed to swap the reels back (block 257) or replace the entire mechanical reel assembly (block 258). If it is determined that the maintenance event is fixed (block 259), the routine 250 may end.

If it is determined that the maintenance event is not fixed (block 259), or that the reel tilt causing the maintenance event still exists after changing the mechanical reel positions (block 256), the slot technician may be directed to replace an electrical connector associated with the reel assembly (block 260). If the reel tilt is fixed as determined at a decision block 262, the repair may be complete. If the reel tilt associated with the maintenance event persists, the slot technician may be directed to replace a printed circuit board of the gaming machine 20 (block 264).

Returning to the block 252, if it is determined that the maintenance event is not recurring, the slot technician may be directed to check for obstructions in the area around the mechanical reels and then reseat the mechanical reels if necessary (block 266). At a decision block 268, if the problem associated with the maintenance event persists, the slot technician may be directed to change the positions of the existing mechanical reels at the block 254, and the diagnostic routine 250 is completed as discussed above. If the problem associated with the maintenance event is corrected, the repair is completed. Either with or without assistance from the casino expert maintenance system 14, the slot technician or any other suitable repair personnel may efficiently and quickly identify and repair problems associated with a maintenance event.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 7:
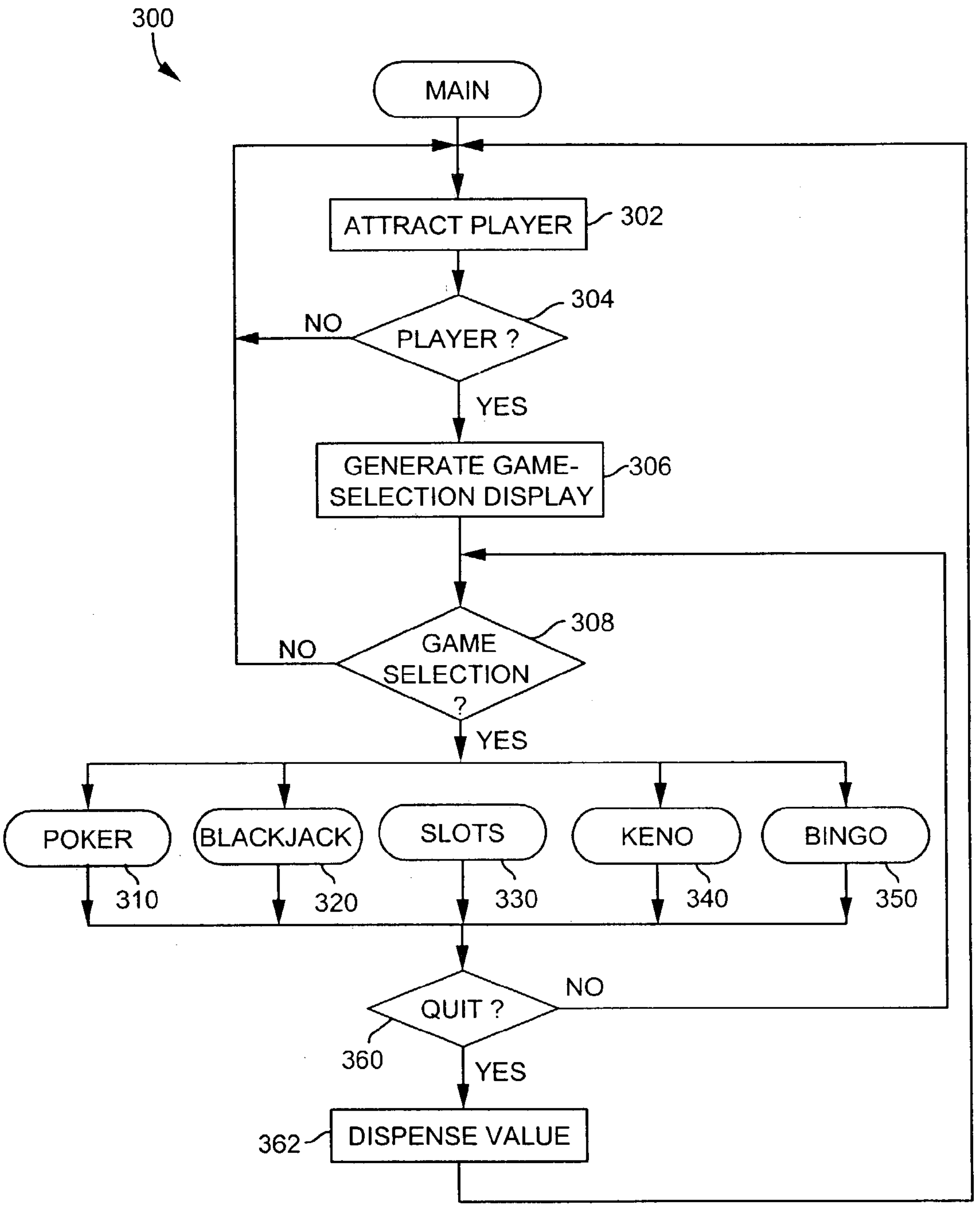
FIG. 7 is a flowchart of an embodiment of a main routime that may be performed during operation of one or more of the gaming units.

FIG. 7 is a flowchart of a main operating routine 300 that may be stored in the memory of the controller 100. Referring to FIG. 7, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 304, the attraction sequence may be terminated and a game-selection display may be generated on the display unit 70 at block 306 to allow the player to select a game available on the gaming unit 20. The gaming unit 20 may detect an input at block 304 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 306 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 308, the controller 100 may cause one of a number of game routines to be performed to allow the selected game to be played. For example, the game routines could include a video poker routine 310, a video blackjack routine 320, a slots routine 330, a video keno routine 340, and a video bingo routine 350. At block 308, if no game selection is made within a given period of time, the operation may branch back to block 302.

After one of the routines 310, 320, 330, 340, 350 has been performed to allow the player to play one of the games, block 360 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 362 based on the outcome of the game(s) played by the player. The operation may then return to block 302. If the player did not wish to quit as determined at block 360, the routine may return to block 308 where the game-selection display may again be generated to allow the player to select another game.

It should be noted that although five gaming routines are shown in FIG. 7, a different number of routines could be included to allow play of a different number of games. The gaming unit 20 may also be programmed to allow play of different games.

Figure 8:
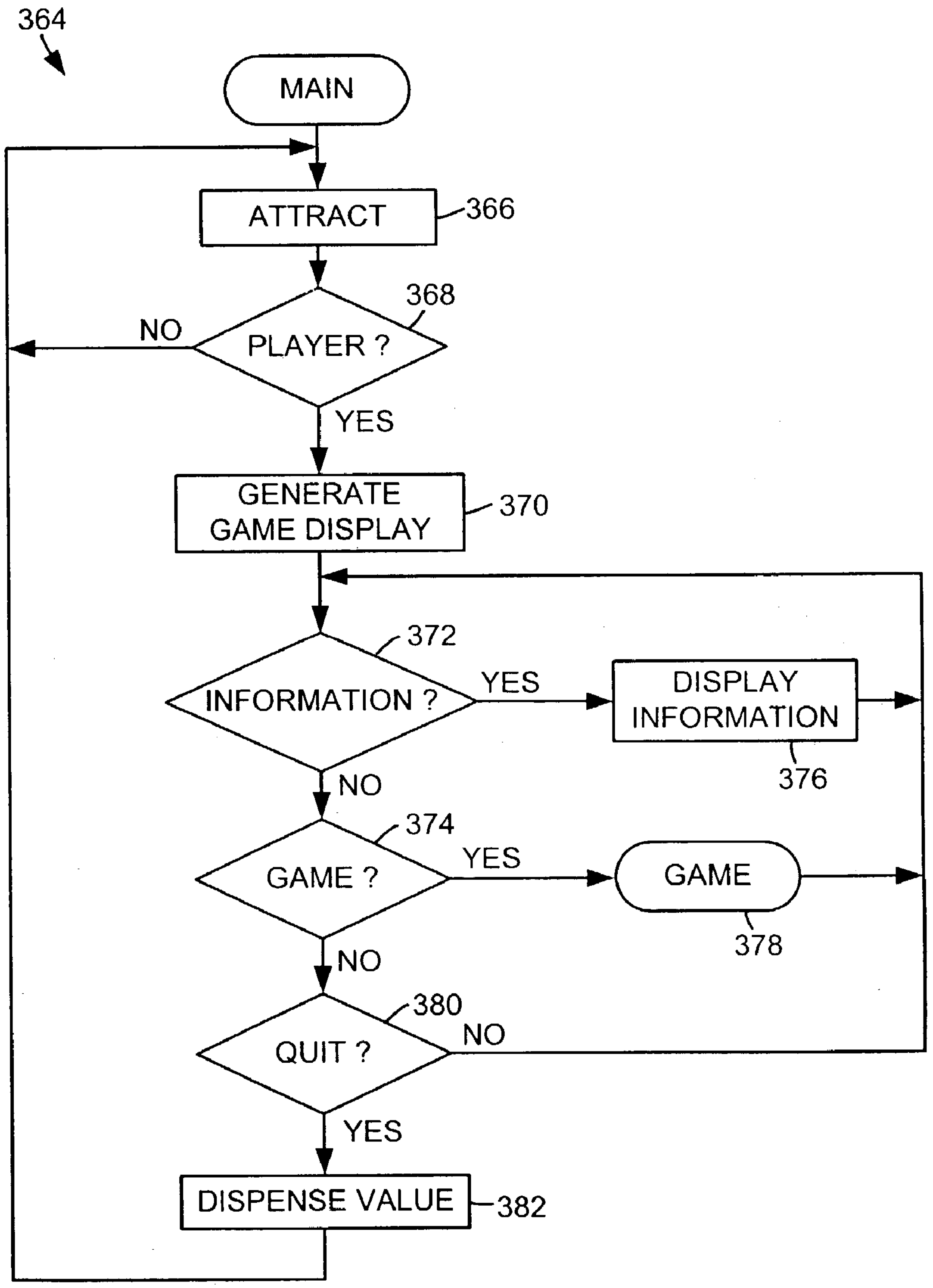
FIG. 8 is a flowchart of an alternative embodiment of a main routine that may be performed during operation of one or more of the gaming units.

FIG. 8 is a flowchart of an alternative main operating routine 364 that may be stored in the memory of the controller 100. The main routine 364 may be utilized for gaming units 20 that are designed to allow play of only a single game or single type of game. Referring to FIG. 8, the main routine 364 may begin operation at block 366 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 368, the attraction sequence may be terminated and a game display may be generated on the display unit 70 at block 370. The game display generated at block 370 may include, for example, an image of the casino game that may be played on the gaming unit 20 and/or a visual message to prompt the player to deposit value into the gaming unit 20. At block 372, the gaming unit 20 may determine if the player requested information concerning the game, in which case the requested information may be displayed at block 376. Block 374 may be used to determine if the player requested initiation of a game, in which case a game routine 378 may be performed. The game routine 378 could be any one of the game routines disclosed herein, such as one of the five game routines 310, 320, 330, 340, 350, or another game routine.

After the routine 378 has been performed to allow the player to play the game, block 380 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 382 based on the outcome of the game(s) played by the player. The operation may then return to block 366. If the player did not wish to quit as determined at block 380, the operation may return to block 370.

Video Poker

Figure 9:
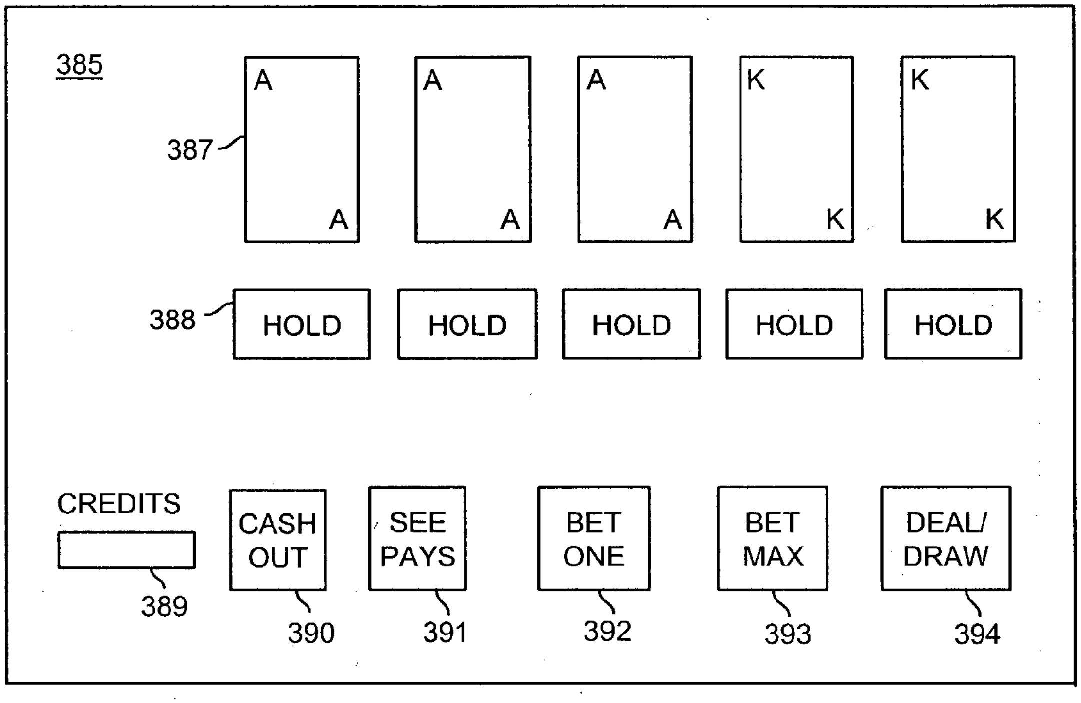
FIG. 9 is an illustration of an embodiment of a visual display that may be displayed during performance of the video poker rountine of FIG. 11.

FIG. 9 is an exemplary display 385 that may be shown on the display unit 70 during performance of the video poker routine 320 shown schematically in FIG. 7. Referring to FIG. 9, the display 385 may include video images 387 of a plurality of playing cards representing the player's hand, such as five cards. To allow the player to control the play of the video poker game, a plurality of player-selectable buttons may be displayed. The buttons may include a "Hold" button 388 disposed directly below each of the playing card images 387, a "Cash Out" button 390, a "See Pays" button 391, a "Bet One Credit" button 392, a "Bet Max Credits" button 393, and a "Deal/Draw" button 394. The display 385 may also include an area 389 in which the number of remaining credits or value is displayed. If the display unit 70 is provided with a touch-sensitive screen, the buttons 388, 390, 391, 392, 393, 394 may form part of the video display 385. Alternatively, one or more of those buttons may be provided as part of a control panel that is provided separately from the display unit 70.

Figure 11:
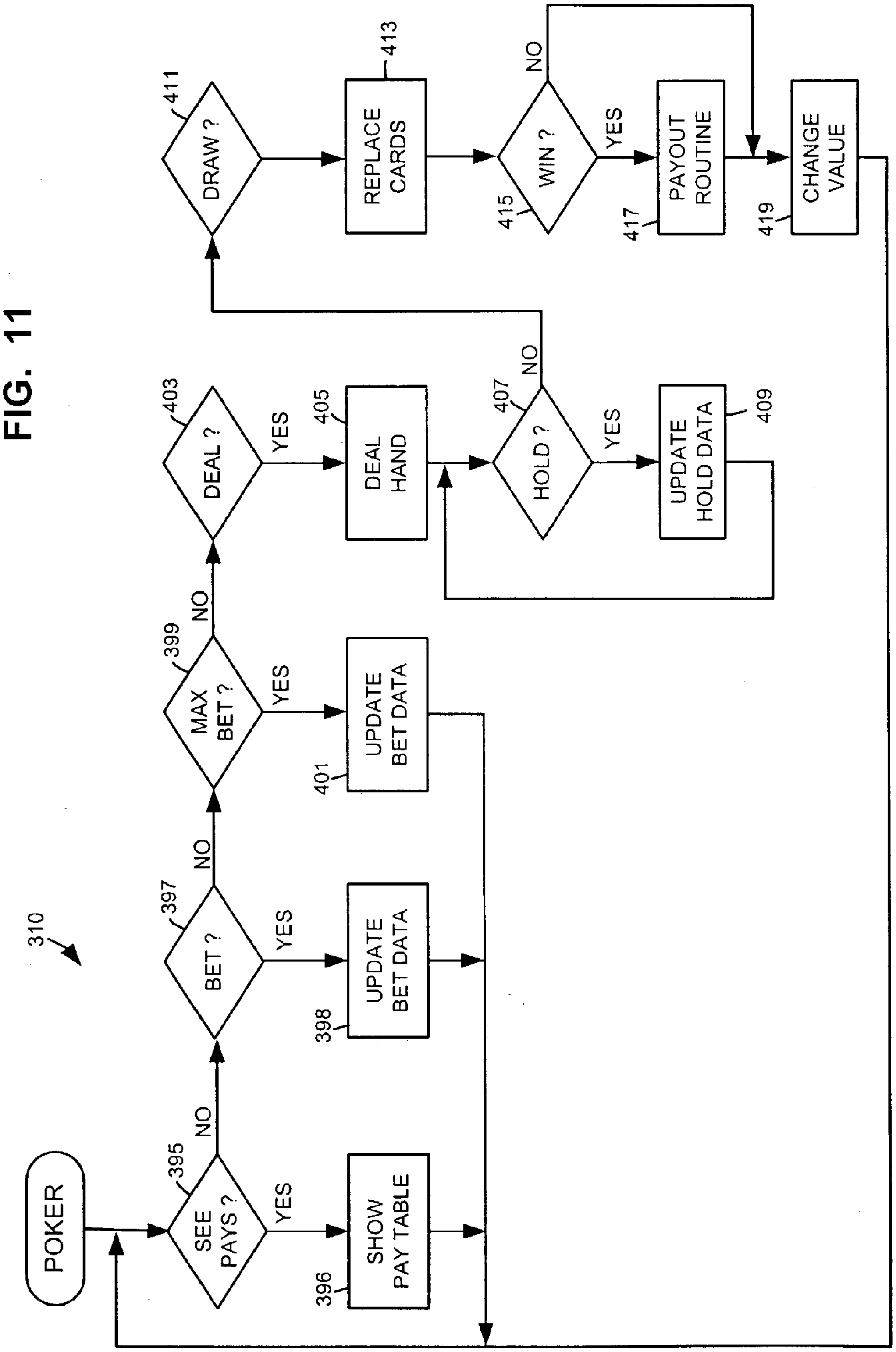
FIG. 11 is a flowchart of an embodiment of a video poker rountine that may be performed by one or more of the gaming units.

FIG. 11 is a flowchart of the video poker routine 310 shown schematically in FIG. 7. Referring to FIG. 11, at block 395, the routine may determine whether the player has requested payout information, such as by activating the "See Pays" button 391, in which case at block 396 the routine may cause one or more pay tables to be displayed on the display unit 70. At block 397, the routine may determine whether the player has made a bet, such as by pressing the "Bet One Credit" button 392, in which case at block 398 bet data corresponding to the bet made by the player may be stored in the memory of the controller 100. At block 399, the routine may determine whether the player has pressed the "Bet Max Credits" button 393, in which case at block 401 bet data corresponding to the maximum allowable bet may be stored in the memory of the controller 100.

At block 403, the routine may determine if the player desires a new hand to be dealt, which may be determined by detecting if the "Deal/Draw" button 394 was activated after a wager was made. In that case, at block 405 a video poker hand may be "dealt" by causing the display unit 70 to generate the playing card images 387. After the hand is dealt, at block 407 the routine may determine if any of the "Hold" buttons 388 have been activated by the player, in which case data regarding which of the playing card images 387 are to be "held" may be stored in the controller 100 at block 409. If the "Deal/Draw" button 394 is activated again as determined at block 411, each of the playing card images 387 that was not "held" may be caused to disappear from the video display 385 and to be replaced by a new, randomly selected, playing card image 387 at block 413.

At block 415, the routine may determine whether the poker hand represented by the playing card images 387 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 417. At block 419, the player's cumulative value or number of credits may be updated by subtracting the bet made by the player and adding, if the hand was a winner, the payout value determined at block 417. The cumulative value or number of credits may also be displayed in the display area 389 (FIG. 9).

Although the video poker routine 310 is described above in connection with a single poker hand of five cards, the routine 310 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 10:
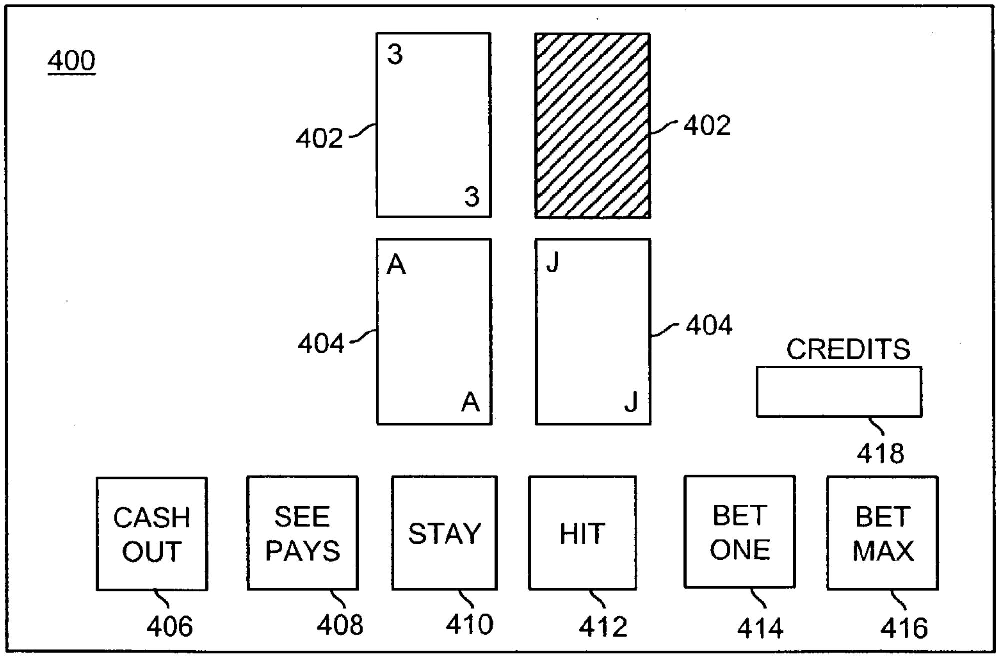
FIG. 10 is an illustration of an embodiment of a visual display that may be displayed during performance of the video blackjack rountine of FIG. 12.

FIG. 10 is an exemplary display 400 that may be shown on the display unit 70 during performance of the video blackjack routine 320 shown schematically in FIG. 7. Referring to FIG. 10, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 12:
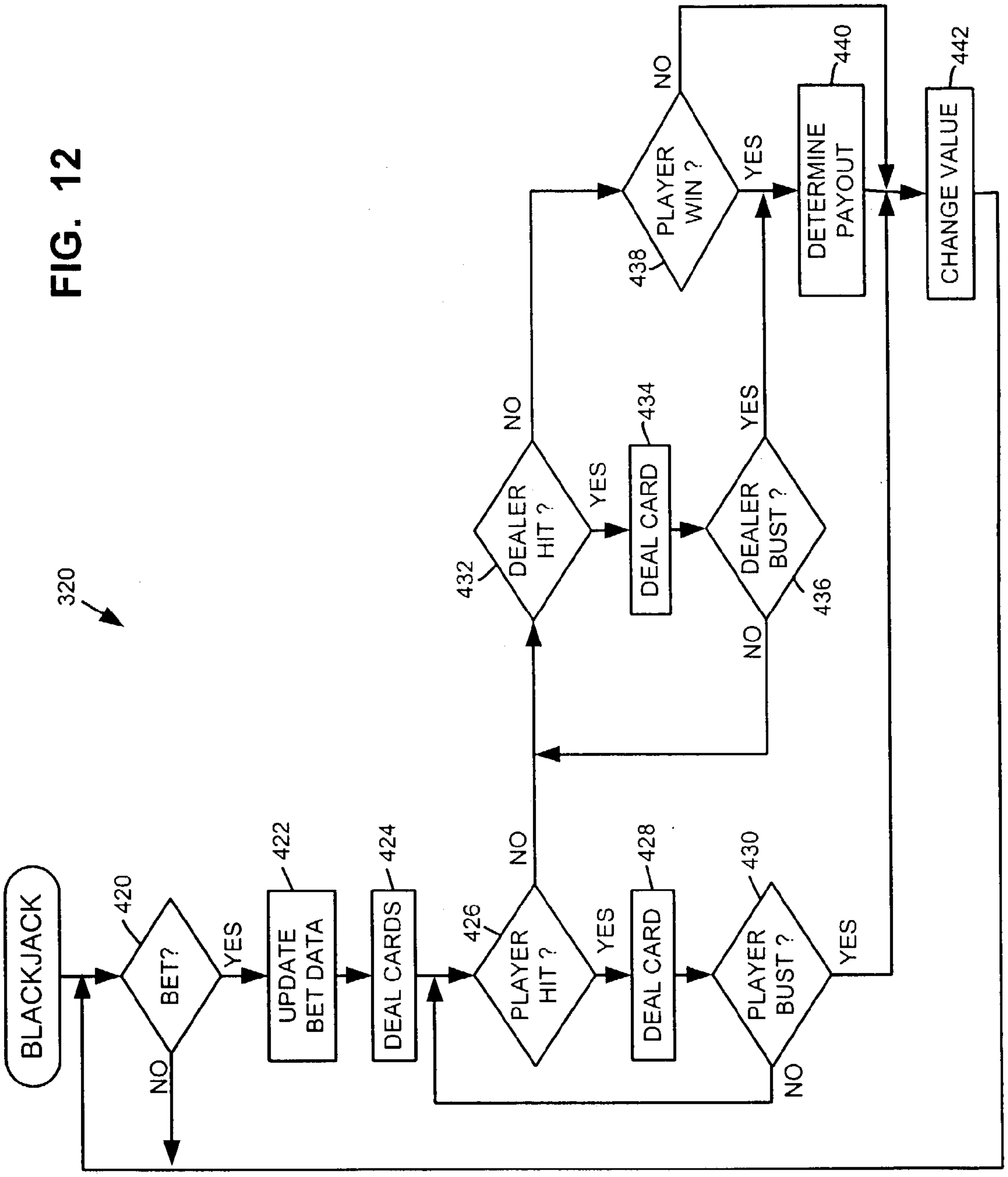
FIG. 12 is a flowchart of an embodiment of a video blackjack routine that may be performed by one or more or the gaming units.

FIG. 12 is a flowchart of the video blackjack routine 320 shown schematically in FIG. 7. Referring to FIG. 12, the video blackjack routine 320 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the, display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 10).

Slots

FIG. 13 is an exemplary display 450 that may be shown on the display unit 70 during performance of the slots routine 330 shown schematically in FIG. 7. Referring to FIG. 13, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 15:
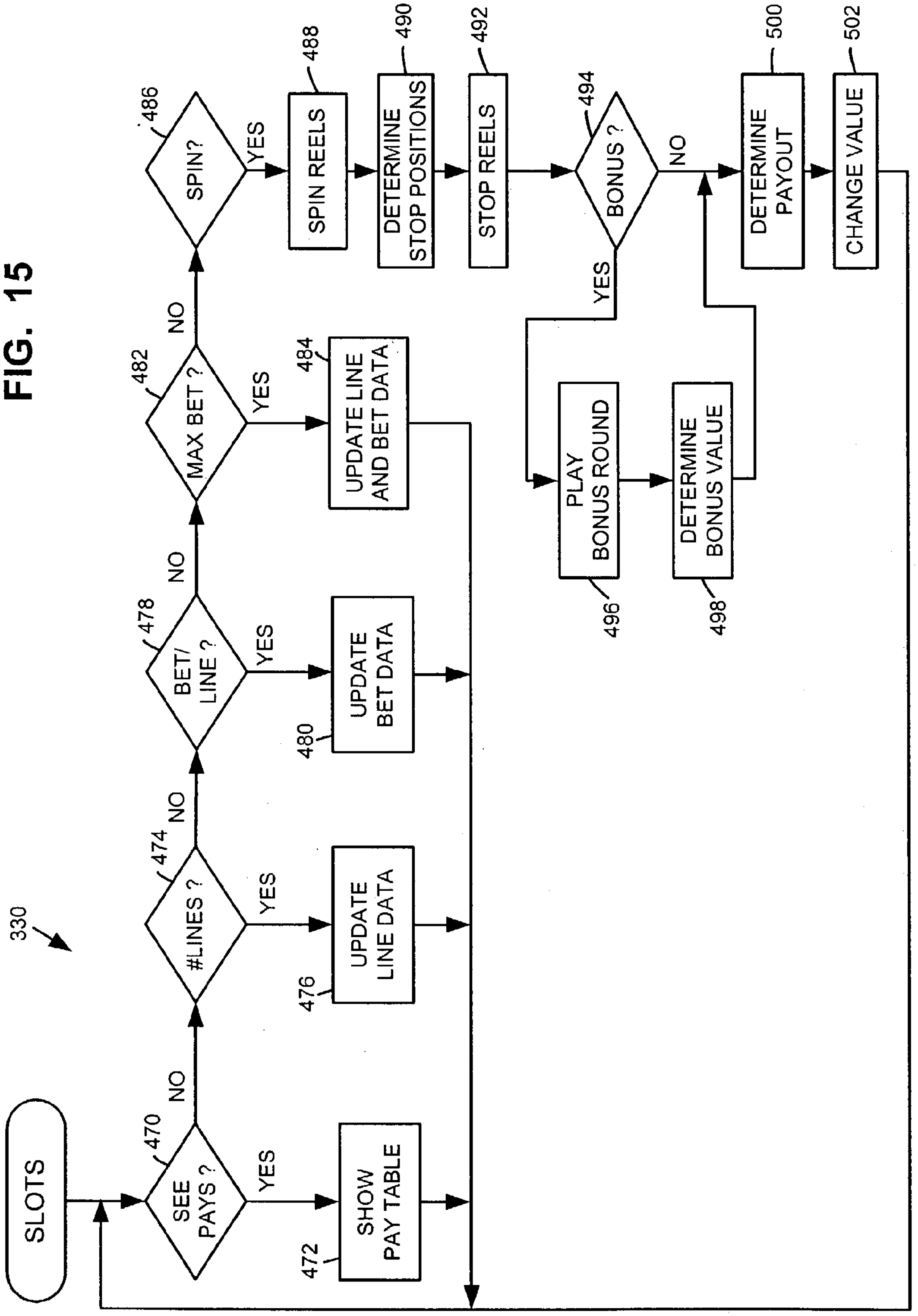
FIG. 15 is a flowchart of an embodiment of a slots routine that may be performed by one or more or the gaming units.

FIG. 15 is a flowchart of the slots routine 330 shown schematically in FIG. 7. Referring to FIG. 15, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 14 is an exemplary display 520 that may be shown on the display unit 70 during performance of the video keno routine 340 shown schematically in FIG. 7. Referring to FIG. 14, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 16:
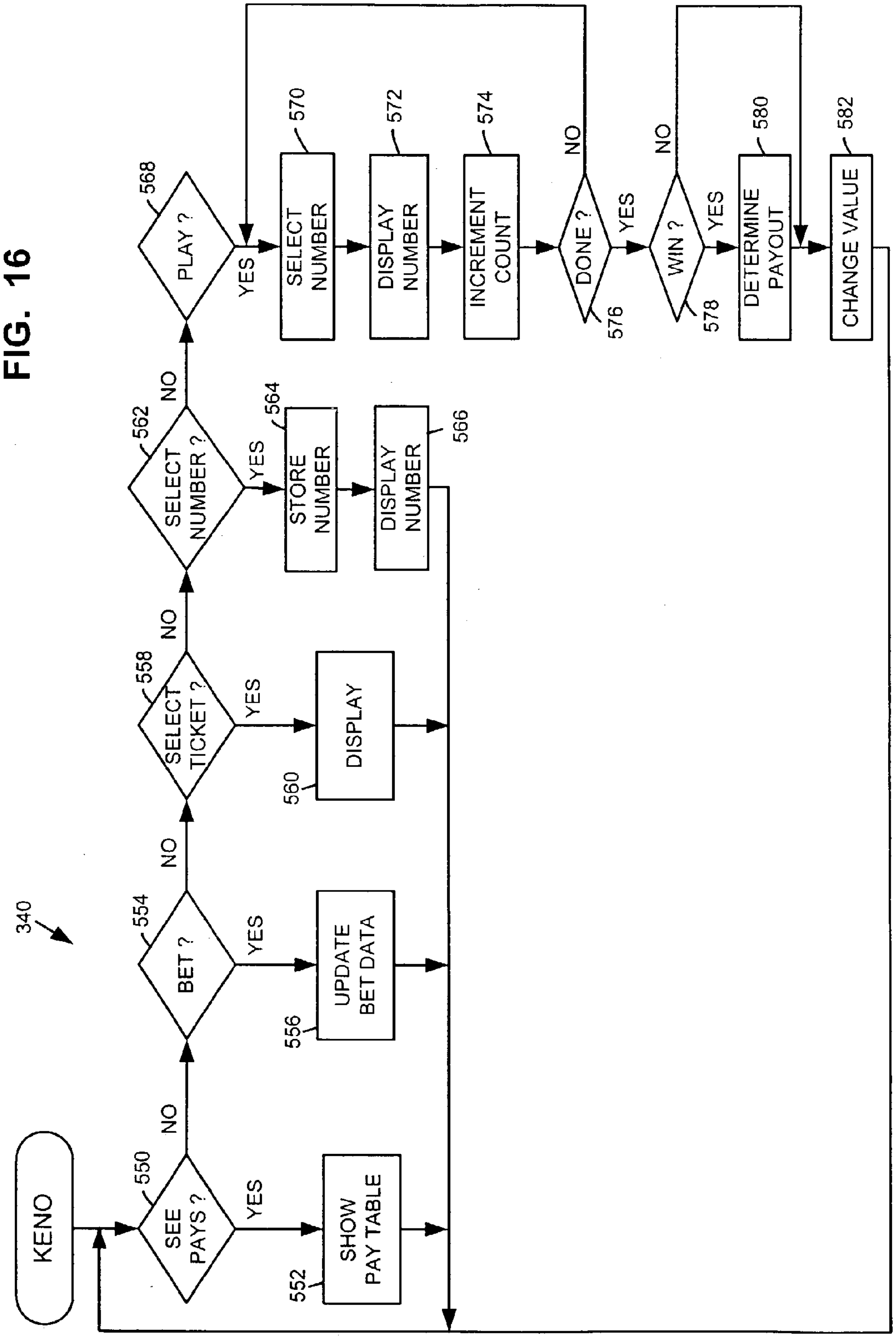
FIG. 16 is a flowchart of an embodiment of a video kent rountine tha may be performed by one or more of the gaming units.

FIG. 16 is a flowchart of the video keno routine 340 shown schematically in FIG. 7. The keno routine 340 may be utilized in connection with a single gaming unit 20 where a single player is playing a keno game, or the keno routine 340 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 16, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 14).

Video Bingo

Figure 17:
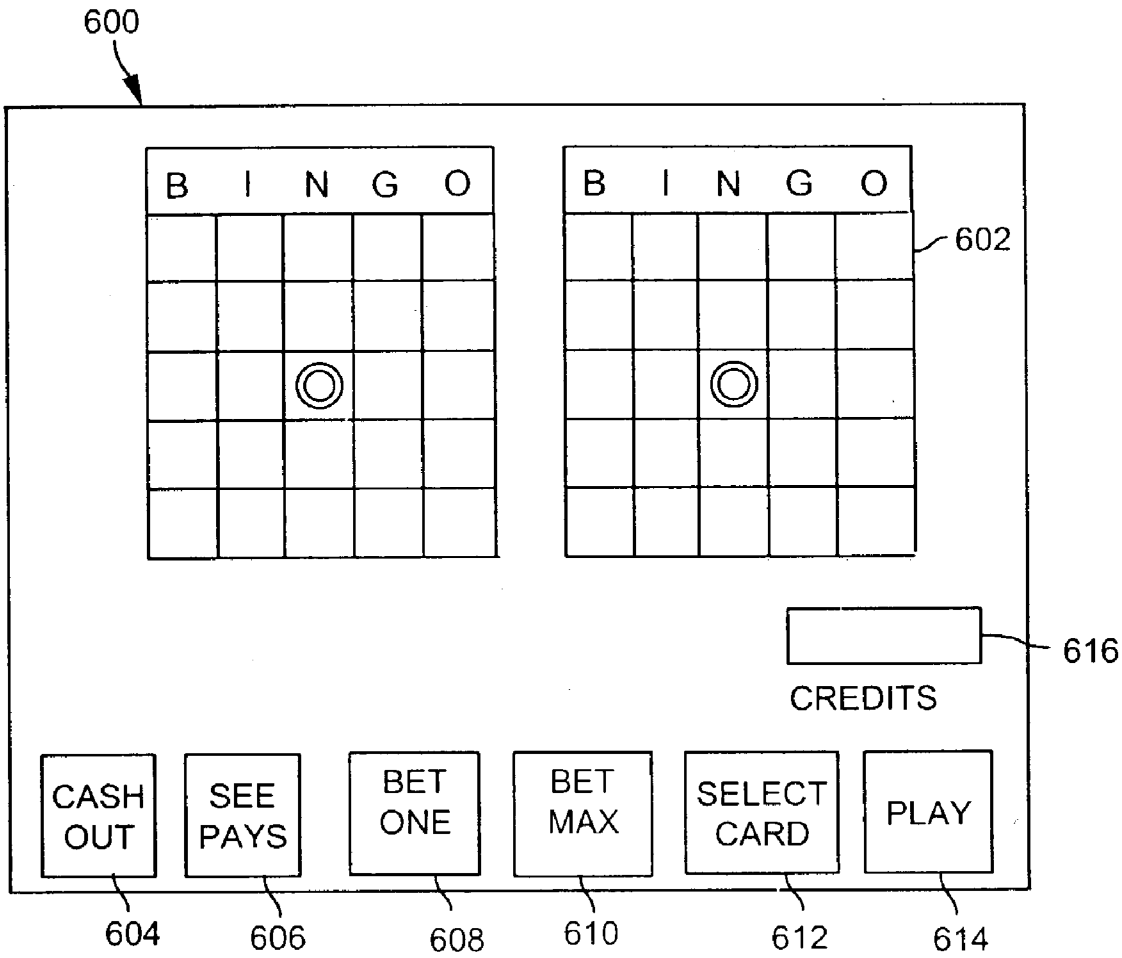
FIG. 17 is an illustration of an embodiment of a visual display that may be displayed during performance of the video bingo routine of FIG. 18.

FIG. 17 is an exemplary display 600 that may be shown on the display unit 70 during performance of the video bingo routine 350 shown schematically in FIG. 7. Referring to FIG. 17, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 18:
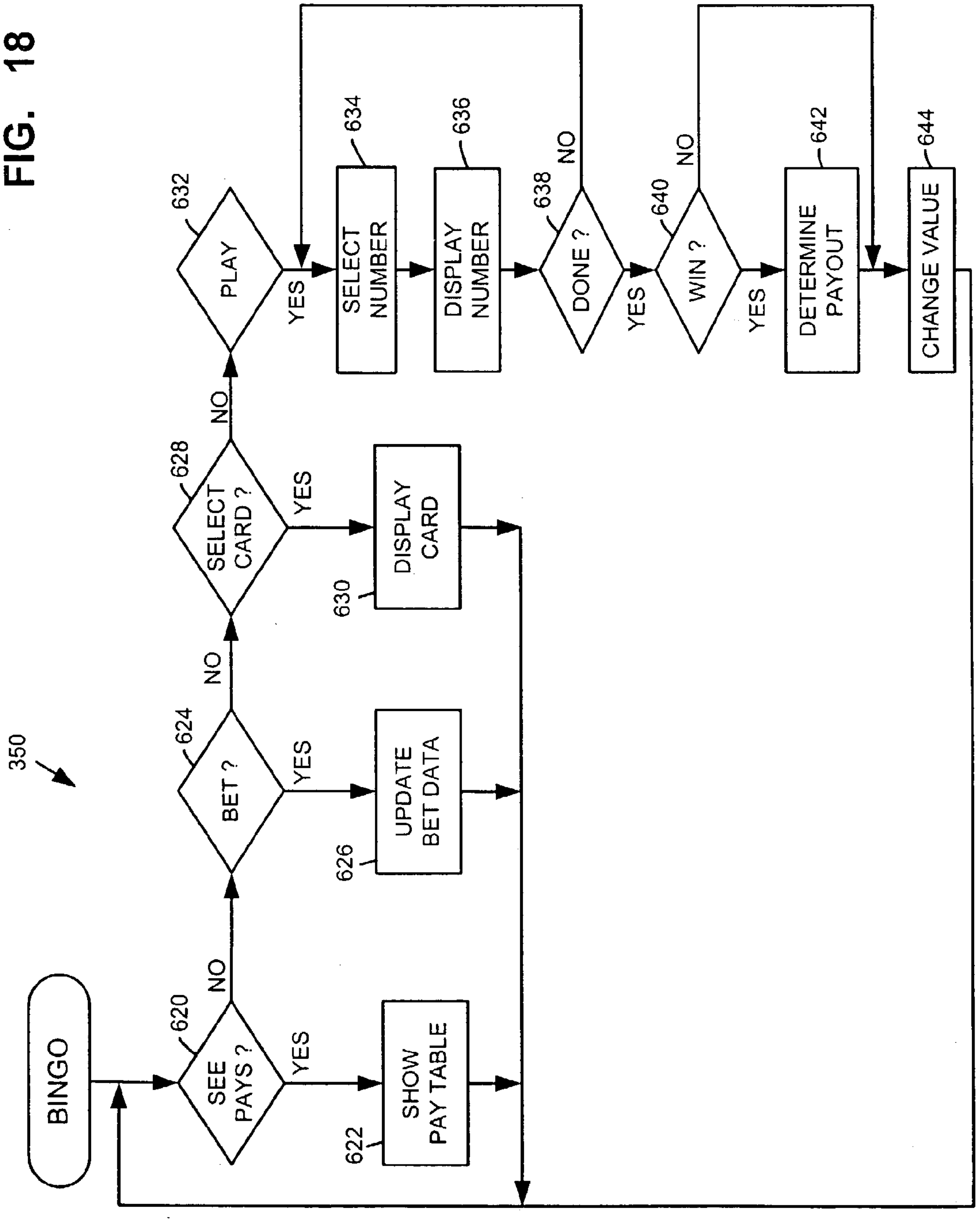
FIG. 18 is a flowchart of an embodiment of a video bingo routine that may be performed by one or more of the gaming units.

FIG. 18 is a flowchart of the video bingo routine 350 shown schematically in FIG. 7. The bingo routine 350 may be utilized in connection with a single gaming unit 20 where a single player is playing a bingo game, or the bingo routine 350 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 18, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 17).

What is claimed is:

1. A handheld maintenance module comprising:

a display unit capable of generating video images;

a wireless transceiver device capable of wireless data transmission and reception, said wireless transceiver device adapted to be wirelessly coupled to a maintenance controller; and a module controller operatively coupled to said display unit and said wireless transceiver device, said module controller comprising a processor and a memory operatively coupled to said processor, said module controller being programmed to allow a person to receive a gaming unit maintenance work order, said gaming unit maintenance work order representing a request for a repair of a gaming unit, said module controller being programmed to cause a video image representing said gaming unit maintenance work order to be displayed on said display unit, said module controller being programmed to cause a video image of one or more instructions to repair said gaming unit to be displayed, said module controller being programmed to cause a gaming unit part order to be generated at a remote location, said gaming unit part order representing a request for a gaming unit part required to perform said repair of said gaming unit, and to notify said person when said gaming unit part is available, said module controller being programmed to allow said gaming unit maintenance work order to be closed upon completion of said repair of said gaming unit, and said module controller being programmed to forward repair data to said maintenance controller, said repair data representing repair information generated during said repair of said gaming unit.

2. A handheld maintenance module as defined in claim 1, wherein said maintenance controller is programmed to update said instructions to repair to include said repair data.

3. A handheld maintenance module as defined in claim 1, wherein said maintenance controller is programmed to generate said gaming unit maintenance work order upon receipt of a gaming unit maintenance event, said gaming unit maintenance event representative of a problem with said gaming unit, said gaming unit work order comprising a gaming unit identification number of said gaming unit and a description of said problem with said gaming unit, and wherein said module controller is programmed to allow said person to acknowledge receipt of said gaming unit maintenance work order.

4. A handheld maintenance module as defined in claim 1, wherein said maintenance controller is programmed to generate a set of data for a casino expert maintenance system, said casino set of data comprising said instructions to repair, said instructions to repair comprising text and images of said repair, said casino expert maintenance system updated with said repair data upon completion of said repair, and wherein said module controller is programmed to allow said person to access said casino expert maintenance system via said display screen.

5. A handheld maintenance module as defined in claim 4, wherein said instructions to repair further comprising an audio message of said repair.

6. A handheld maintenance module as defined in claim 1, further comprising a speaker and a microphone, wherein said module controller is programmed to allow said person to communicate with another person or another handheld maintenance controller during said repair of said gaming unit.

7. A handheld maintenance module as defined in claim 6, said speaker being capable of receiving a verbal instruction.

8. A handheld maintenance module as defined in claim 1, wherein said wireless transceiver comprises an optical transceiver capable o F optical data transmission and reception, said optical transceiver of said handheld maintenance module being optically coupled to an optical transceiver of said gaming unit, wherein said module controller is programmed to facilitate communication between said optical transceiver of said handheld maintenance monitor and said optical transceiver of said gaming unit, and wherein said module controller is programmed to allow a repair person to query said gaming unit for a set of gaming unit diagnostic information via said optical transceiver.

9. A gaming system that allows automated gaming unit maintenance event notification, said gaming system comprising:

a plurality of gaming units, one of said gaming units comprising:

a display unit that is capable of generating video images;

a first wireless transceiver device capable of wireless data transmission;

a controller operatively coupled to said display unit and said wireless transceiver device, said controller comprising a processor and a memory operatively coupled to said processor of said gaming unit controller, said controller being programmed to allow a gaming person to make a wager, said controller being programmed to cause a video image to be generated on said display unit, said video image representing a game, said controller being programmed to determine a value payout associated with an outcome of said game represented by said video image;

a maintenance computer operatively coupled to said one of said gaming units, said maintenance computer comprising:

a second wireless transceiver device capable of wireless data transmission and reception;

a maintenance database that stores a set of maintenance data comprising a set of gaming unit maintenance event data, a set of repair data, and a repair instruction;

a maintenance controller operatively coupled to said maintenance database and said second wireless transceiver device, said maintenance controller comprising a processor and a memory operatively coupled to said processor of said maintenance controller, said maintenance controller being programmed to generate a gaming unit maintenance work order upon receipt of a gaming unit maintenance event, said gaming unit maintenance event representing a problem with one of said gaming units, said gaming unit maintenance work order representing a request for a repair of said one gaming unit, and said maintenance controller being programmed to generate a set of data for a casino expert maintenance system, said casino expert maintenance system comprising an instruction to repair said one gaming unit;

a handheld maintenance module comprising:

a display unit capable of generating video images;

a third wireless transceiver device capable of wireless data transmission and reception, said third wireless transceiver device adapted to be wirelessly coupled to said maintenance computer;

a module controller operatively coupled to said display unit and said third wireless transceiver device, said module controller comprising a processor and a memory operatively coupled to said processor of said module controller, said module controller being programmed to allow a repair person to receive said gaming unit maintenance work order representing said request for said repair of said one gaming unit, said module controller being programmed to cause a video image representing said gaming unit maintenance work order to be displayed on said display unit of said handheld maintenance module, said module controller being programmed to access said casino expert maintenance system and cause a video image of said instruction to repair to be displayed on said display unit of said handheld maintenance module, said module controller being programmed to allow said gaming unit maintenance work order to be closed upon completion of said repair of said one gaming unit, and said module controller being programmed to forward a set of repair data to said maintenance controller, said set of repair data resulting from said repair of said one gaming unit.

10. A gaming system as defined in claim 9, further comprising an event transaction processor operatively coupled to said one of said plurality of gaming units, said maintenance computer, and a management database, said event transaction processor adapted to route an event that is received from said one of said gaming units to said maintenance computer when said event transaction processor determines that said received event is a gaming unit maintenance event; and said event transaction processor adapted to store an event that is received from said one of said gaming units to said management database when said event transaction processor determines that said received event is not a gaming unit maintenance event.

11. A gaming system as defined in claim 9, wherein said handheld maintenance module further comprises a speaker and a microphone, wherein said module controller is programmed to allow a repair person to communicate with another person or another haudheld maintenance module during said repair of said one gaming unit.

12. A gaming system as defined in claim 10, further comprising a group data controller operatively coupled to said plurality of gaming units and said event transaction processor, said group data controller configured to accumulate and route an event received from said one of said plurality of gaming units to said event transaction processor.

13. A maintenance method for a gaming machine, said maintenance method comprising:

causing a video image representing a gaming unit maintenance work order to be generated on a display unit of a handheld maintenance module in response to an occurrence of a gaming unit maintenance event in a gaming unit, said gaming unit maintenance event representing a problem with said gaming unit, said video image representing a request for a repair of a gaming unit to be generated;

enabling access to a casino expert maintenance system that provides repair instructions to repair said problem with said gaming unit;

causing a video image representing said repair instructions to be displayed on said display unit;

generating a gaming unit part order at a remote location, said gaming unit part order representing a request for a gaming unit part required to perform said repair of said gaming unit;

notifying a person when said gaming unit part is available for receipt by said person allowing said gaming unit maintenance work order to be closed upon completion of said repair of said gaming unit;

causing repair data generated during said repair of said gaming unit to be forwarded to a maintenance controller.

14. A method as defined in claim 13, further comprising allowing said person to communicate with another person during said repair of said gaming unit.

15. A method as defined in claim 13, further comprising enabling said person to query said gaming unit for gaming unit diagnostic information via an optical transceiver.

16. A maintenance method for a first gaming machine, said maintenance method comprising:

causing a video image representing a first gaming unit maintenance work order to be generated on a display unit of a second gaming unit in response to an occurrence of a first gaming unit maintenance event in said first gaming unit, said first gaming unit maintenance event representing a problem with said first gaming unit, said video image representing a request for a repair of said first gaming unit;

enabling access to a casino expert maintenance system that provides repair instructions to repair said problem with said first gaming unit;

causing a video image representing said repair instructions to be displayed on said display unit;

generating a gaming unit part order at a remote location, said gaming unit part order representing a request for a gaming unit part required to perform said repair of said first gaming unit;

notifying a person when said gaming unit part is available for receipt by said person;

allowing said first gaming unit maintenance work order to be closed upon completion of said repair of said first gaming unit;

causing repair data generated during said repair of said first gaming unit to be forwarded to a maintenance controller.

17. A method as defined in claim 16, further comprising allowing said person to communicate with another person during said repair of said first gaming unit.

18. A method as defined in claim 16, wherein said first gaming unit is said second gaming unit.

19. A method as defined in claim 16, wherein said first gaming unit and said second gaming unit are different.

20. A method as defined in claim 16, wherein said first gaming unit and the second gaming unit are stationary units.

21. A handheld maintenance module comprising:

a communication unit capable of generating audio signals;

a wireless transceiver device capable of wireless data transmission and reception, said wireless transceiver device adapted to be wirelessly coupled to a maintenance controller; and a module controller operatively coupled to said communication unit and said wireless transceiver device, said module controller comprising a processor and a memory operatively coupled to said processor, said module controller programmed to cause a gaming unit part order to be generated at a remote location, said gaming unit part order representing a request for a gaming unit part required to perform said repair of said gaming unit, and to notify said person when said gaming unit part is available, said module controller being programmed to allow a person to receive a gaming unit maintenance work order, said gaming unit maintenance work order representing a request for a repair of a gaming unit, said module controller being programmed to cause a first audio message representing said gaming unit maintenance work order to be generated on said communication unit, said module controller being programmed to cause a second audio message of one or more instructions to repair said gaming unit to be generated, said module controller being programmed to allow said gaming unit maintenance work order to be closed upon completion of said repair of said gaming unit, and said module controller being progranirned to forward repair data to said maintenance controller, said repair data representing repair information generated during said repair of said gaming unit.

22. A handheld maintenance module as defined in claim 21, wherein said communication unit is a speaker.

23. A handheld maintenance module as defined in claim 21, wherein said maintenance controller is programmed to update said instructions to repair to include said repair data.

24. A handheld maintenance module as defined in claim 21, wherein said maintenance controller is programmed to generate said gaming unit maintenance work order upon receipt of a gaming unit maintenance event, said gaming unit maintenance event representative of a problem with said gaming unit, said gaming unit work order comprising a gaming unit identification number of said gaming unit and a description of said problem with said gaming unit, and wherein said module controller is programmed to allow said person to acknowledge receipt of said gaming unit maintenance work order.

25. A handheld maintenance module as defined in claim 21, wherein said maintenance controller is programmed to generate a set of data for a casino expert maintenance system, said set of data comprising said instructions to repair, said instructions to repair comprising an audio description of said repair, said casino expert maintenance system updated with said repair data upon completion of said repair, and wherein said module controller is programmed to allow said person to access said casino expert maintenance system via said communication unit.

26. A handheld maintenance module as defined in claim 21, wherein generating said second audio message comprises converting a text message to an audio message.

27. A maintenance method for a gaming machine, said maintenance method comprising:

determining if an occunence of an event in a gaming unit is a gaming unit maintenance event, said gaming unit maintenance event representing a problem with said gaming unit;

generating a gaming unit maintenance work order corresponding to said gaming unit maintenance event;

storing a set of data associated with said gaming unit maintenance event and said gaming unit maintenance work order in a database;

causing a gaming unit part order to be generated at a remote location, said gaming unit part order representing a request for a gaming unit part required to perform a repair of said gaming unit;

causing a video image representing said gaming unit maintenance work order to be generated on a display unit of a handheld maintenance module, said video image representing a request for a repair of a gaming unit to be generated;

enabling access to a casino expert maintenance system that provides repair instructions to repair said problem with said gaming unit;

causing a video image representing said repair instructions to be displayed on said display unit;

allowing said gaming unit maintenance work order to be closed upon completion of said repair of said gaming unit;

causing repair data generated during said repair of said gaming unit to be forwarded to a maintenance controller.

28. A method as defined in claim 27, further comprising enabling access to a casino expert maintenance system that provides repair instructions to repair said problem with said gaming unit.

29. A handheld maintenance module comprising:

a display unit capable of generating video images;

an optical transceiver device capable of optical data transmission and reception, said optical transceiver device adapted to be optically coupled to an optical transceiver of a maintenance controller, wherein said maintenance controller is programmed to facilitate communication between said optical transceiver device of said handheld maintenance module and said optical transceiver of said maintenance controller, and wherein said maintenance controller is programmed to allow a repair person to query said maintenance controller for a set of gaming unit diagnostic information via said optical transceiver;

a module controller operatively coupled to said display unit and said optical transceiver device, said module controller comprising a processor and a memory operatively coupled to said processor, said module controller being programmed to allow a person to receive a gaming unit maintenance work order, said gaming unit maintenance work order representing a request for a repair of a gaming unit, said module controller being programmed to cause a video image representing said gaming unit maintenance work order to be displayed on said display unit, said module controller being programmed to cause a video image of one or more instructions to repair said gaming unit to be displayed, said module controller being programmed to allow said gaming unit maintenance work order to be closed upon completion of said repair of said gaming unit, and said module controller being programmed to forward repair data to said maintenance controller, said repair data representing repair information generated during said repair of said gaming unit.

30. A handheld maintenance module as defined in claim 1, wherein said maintenance controller is programmed to generate said gaming unit maintenance work order upon receipt of a gaming unit maintenance event, said gaming unit maintenance event representative of a problem with said gaming unit, said gaming unit work order comprising a gaming unit identification number of said gaming unit and a description of said problem with said gaming unit, and wherein said module controller is programmed to allow said person to acknowledge receipt of said gaming unit maintenance work order.

* * * * *

UNITED STATES PATENT AND TRADEMARK OFFICE

CERTIFICATE OF CORRECTION

PATENT NO. : 7,201,660 B2 Page 1 of 1
APPLICATION NO. : 10/440930
DATED : April 10, 2007
INVENTOR(S) : Daryn G. Kiely et al.

It is certified that error appears in the above-identified patent and that said Letters Patent is hereby corrected as shown below:

On The Title Page, Item (57)

(57), line 6, "device.  the" should be -- device.  The --.

At Column 23, line 60, "capable o F optical" should be -- capable of optical --.

At Column 27, line 47, "occunence" should be -- occurrence --.

Signed and Sealed this

Twenty-third Day of October, 2007

JON W. DUDAS
*Director of the United States Patent and Trademark Office*